(12) United States Patent
Sharma et al.

(10) Patent No.: US 12,045,302 B2
(45) Date of Patent: Jul. 23, 2024

(54) DETERMINING WHETHER AND/OR HOW TO IMPLEMENT REQUEST TO PREVENT PROVISION OF SEARCH RESULT(S)

(71) Applicant: GOOGLE LLC, Mountain View, CA (US)

(72) Inventors: Divya Sharma, Sunnyvale, CA (US); Wei Chen, Belmont, MA (US); Ron Eden, Menlo Park, CA (US); Maryam Garrett, Cambridge, MA (US); Bryan Christopher Horling, Belmont, MA (US); Angel Rodriguez, San Francisco, CA (US); Sean Jordan, Austin, TX (US); Onur Ozdemir, Arlington, MA (US); Molly Murphy, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/106,856

(22) Filed: Feb. 7, 2023

(65) Prior Publication Data
US 2023/0367835 A1      Nov. 16, 2023

Related U.S. Application Data

(60) Provisional application No. 63/340,658, filed on May 11, 2022.

(51) Int. Cl.
*G06F 16/957* (2019.01)
*G06F 16/953* (2019.01)
*G06F 16/958* (2019.01)

(52) U.S. Cl.
CPC .......... *G06F 16/957* (2019.01); *G06F 16/953* (2019.01); *G06F 16/986* (2019.01)

(58) Field of Classification Search
CPC ..... G06F 16/957; G06F 16/986; G06F 16/953
See application file for complete search history.

(56) References Cited

U.S. PATENT DOCUMENTS

| 2009/0319510 A1* | 12/2009 | Miller | G06F 16/40 |
| | | | 707/999.005 |
| 2014/0149392 A1* | 5/2014 | Wang | G06F 16/93 |
| | | | 707/722 |
| 2016/0360336 A1* | 12/2016 | Gross | H04W 4/025 |
| 2017/0322929 A1* | 11/2017 | Hussain | G06F 9/45558 |

* cited by examiner

*Primary Examiner* — Kuen S Lu
(74) *Attorney, Agent, or Firm* — Gray Ice Higdon

(57) ABSTRACT

Implementations relate to determining whether and/or how to implement a user request to prevent a particular search result from being provided in response to a search query. Some of those implementations grant or deny the request based on processing of the particular search result, the search query, and/or account information for a user submitting the user request. For example, some implementations process such information utilizing a classifier in determining whether to automatically deny the request, automatically approve the request, or to provide the request for manual review. Some additional or alternative implementations at least selectively automatically expand (or suggest for automatic expansion) an approval of a request to search result(s) and/or to one or more search queries that are not specified in the request.

20 Claims, 13 Drawing Sheets

DETERMINING WHETHER AND/OR HOW TO IMPLEMENT REQUEST TO PREVENT PROVISION OF SEARCH RESULT(S)

BACKGROUND

A user can encounter information, on a webpage or other Internet document, that includes personal information and/or other information that can potentially be harmful to the user and/or compromise security of data of the user. For example, a user can submit a search query to a search engine and identify a search result that is returned by the search engine responsive to the search query. Further, the user can identify that the search result itself and/or the web document corresponding to the search result (e.g., the web document linked-to by the search result) includes personal information regarding the user.

Although techniques have been proposed for enabling a user to request that a search result no longer be provided by a search engine responsive to a search query, such techniques suffer from various drawbacks. For example, some techniques require all or a substantial majority of requests be manually reviewed in determining whether to approve the requests. This causes utilization of significant client device resources, of the client devices utilized in manual review, as the client devices must retrieve and render information related to the requests (e.g., the requests themselves, the underlying search result and/or web document) during the manual review. Further, this introduces latency in processing requests, which can be particularly problematic when security of data is at stake. As another example, some techniques always restrict requests and/or their implementations to a single search result and/or a single search query. This can result in potentially harmful search result(s) still being provided for the single search query and/or one or more other search queries. Further, this can result in submission of multiple requests by a user (e.g., with each request being for an additional search result and/or an additional search query), and utilization of computational and network resources in processing the multiple requests.

SUMMARY

Implementations disclosed herein relate to preventing one or more search results from being provided in response to a submitted search query. Some implementations include receiving a user request to prevent a search result from being provided by a search engine responsive to a search query, determining whether to prevent the search result from being provided, and, if it is determined that the search result should be prevented, preventing the search result from being provided. As described herein, various techniques can be utilized in determining whether to prevent a search result from being provided. Some of those techniques can seek to prevent search results from being provided when they serve de minimis or no public interest and/or when they compromise security of a user's data and/or otherwise potentially harm user(s). In these and other manners, irrelevant and/or potentially harmful search result(s) can be prevented from being provided responsive to a search query. This can conserve server-side resources that would otherwise be utilized in generating and/or transmitting data for such search result(s) to a client device responsive to the search query. This can additionally or alternatively conserve client-side resources that would otherwise be utilized in rendering such search result(s) and/or scrolling past such search result(s) in identifying relevant and/or non-harmful search result(s).

In some implementations, additional search queries can be identified that also provide a search result that corresponds to the search result indicated in the request of the user, and the corresponding search result can be prevented from being provided responsive to the additional search queries. A corresponding search result and the search result can both be for (e.g., link to) the same web document, but may vary in one or more respects. For example, a corresponding search result can include a different snippet, from the web document, than does the search result. In implementations that prevent corresponding search result(s) from being provided responsive to additional search queries, the conservation of the client-side and/or server-side resources mentioned above can be amplified. Further, in some versions of those implementations, the corresponding search result(s) are prevented from being provided responsive to the additional search queries based on a single request that specifies only the search query and without any user specification (in the request or otherwise) of the additional search queries. Accordingly, resources are conserved by obviating the need for submission of multiple requests and/or obviating the need for user input(s) to be provided to specify the additional search queries in the request. Yet further, in some versions of those implementations whether corresponding search result(s) are prevented from being provided responsive to additional search queries and/or an extent of such prevention (e.g., the amount of additional search queries for which prevention applies) is dynamically determined in dependence on the request. In these and other manners the various benefits from such prevention can be achieved when appropriate, while ensuring that potentially relevant corresponding search results are not inadvertently prevented from provision responsive to additional search queries.

In some additional or alternative implementations, additional web documents can be identified that are related to the search query included with the request, and additional search results related to the additional web documents may be prevented from being provided in response to the search query included with the request and, optionally, one or more additional search queries. Thus, resources are conserved by reducing the number of requests that a user is required to submit, and the computing resources required to process those requests, by suggesting to the user preemptively one or more additional web documents. Thus, the user is not required to navigate to the additional web documents and submit multiple requests but instead can submit a single request that can result in multiple search results related to multiple web documents being prevented from being provided.

As an example, a user can identify a search result that is returned by a search engine responsive to a search query and that links to a web document that includes information that is personal to the user and which the user does not wish to be readily accessible by others. This information can include, for example, the date of birth of the user, the address of the user, the social security number of the user, banking information of the user, image(s) of the user, and/or other sensitive information that the user does not want to be accessible by other users. In response, the user can provide, via user interface input(s) at an interface, a request that includes an indication of the web document and/or the search result, an indication of the search query, and optionally additional information such as an indication of an account of the user and/or an indication of the personal content that is included in the web document (e.g., specifying type(s) of personal content and/or specifying the particular personal content). The request can then be reviewed, utilizing one or more techniques described herein, to determine whether to grant or deny the request. For example, if the web document includes information of a sensitive nature (e.g., password information, banking information) and/or is from a source that is not of public interest (e.g., a web document from an unknown origin), the request can be granted. For instance, granting the request can result in at least preventing the search result from being provided responsive to future instances of submission of the search query by the user or any other users.

In some implementations, one or more additional queries that are related to the query provided in the request can be identified to determine whether the additional queries, when submitted to the search engine, provide a search result related to the web document. For example, a request can indicate that a search result for a web document was provided responsive to a search query of "John Patrick Smith bank account." If a search result for that query is related to Document A, which has sensitive information related to "John Patrick Smith," the request can be granted to cause prevention of provision of that search result for future occurrences of that search query of the request. Further, additional search queries that also provide a search result for Document A in response to the additional search query being submitted may also be identified (e.g., using an index that maps documents to queries to which they are responsive) and Document A can be prevented from being provided responsive to those additional queries. For example, the queries "John P. Smith bank account," "John Smith bank," and "John P Smith account information" may all provide a search result related to Document A. In response, a search result related to Document A can be prevented from being provided in response to one or more of those queries.

In some implementations, one or more additional web documents can be identified that include at least a portion of the same information as the web document (or search result related to the web document) that was provided with the request from the user. For example, Document A may include a social security number of "John Patrick Smith," and the request may include an indication of Document A and/or the search query of "John Patrick Smith social security number." In response, Document B can be identified that also includes the social security number of John Patrick Smith. Document B may then be flagged and/or otherwise tagged to indicate that search results related to Document B should also be prevented from being provided in response to the search query and, optionally, one or more additional search queries.

In some implementations, once the request has been granted and additional web documents have been identified (e.g., via crawling), new web documents that are identified by the search engine for indexing may be reviewed to determine whether the new web document includes information that was included in the web document for which the request to prevent was granted. For example, a request to prevent search results for Document A may have been granted. A new web document, Document C, may be identified by the search engine as not being previously indexed by the search engine (e.g., identified via a web crawler and/or other techniques). Based on a request for Document A having been granted, Document C and Document A can be compared to generate a similarity measure that indicates how similar all or aspects of Document C and Document A are to one another. If it is determined, based on the similarity measure, that Document C includes information that is similar or the same as the information included in Document A (for which the request has been granted), Document C may not be indexed by the search engine Document C may be tagged as being prevented from being provided in response to one or more search queries (i.e., treated in the same manner as search result(s) related to Document A), and/or otherwise being omitted from the results at the time they are provided.

Similarly between documents can be determined based on, for example, textual similarity between the documents, similarity in HTML and/or XML tags of the documents, similarity in sources and/or domains of the documents, and/or other techniques that can determine commonalities between web documents. By identifying similar documents to the web document of the request of the user, and preventing corresponding search result(s) from being provided, computing resources can be conserved by not requiring the processing of multiple requests from the user.

In some implementations, a request from a user can include a search query that was submitted and that resulted in a search result that the user has interest in preventing from being provided in response to future submissions of the query and/or in response to future submissions of additional queries. Further, the request can include the search result and/or other indication of the underlying web document that the user has interest in preventing from being provided in response to future search queries. Still further, the request can include information related to an account of the user.

In some implementations, determining whether to prevent search results related to a web document from being provided in response to one or more search queries can be determined based on one or more rules and/or other heuristic approaches. For example, the web document can be processed to determine whether it includes information that may be related to the user (e.g., a portion of the web document that appears to include a phone number, a social security number, a credit card number). For instance, a user can submit a request for a web document that allegedly includes an address, but, on review of the web document (e.g., an automated review utilizing one or more regular expressions), it can be determined that no portion of the web document appears to be an address. Also, for example, the web document can be processed to determine its origin (e.g., the domain where the web document resides, the originating author of the document). Further, the web document can be reviewed to determine how popular the web document is to other users (e.g., number of clicks on search result per day, number of views and/or duration of views of the web document by other users).

In some implementations, account information of the user that is requesting the prevention of search results for a web document can be utilized to determine whether to grant the request. For example, an account of a user may be associated with a phone number, email address, physical address, and/or other information that can be used to verify that the user's information is included in the web document that is indicated by the request. Also, for example, the age of the account of the user (i.e., an amount of time since the account was created), whether information of the account has been changed recently, and/or other indication(s) of the authenticity of the account can be utilized to determine whether to grant or deny a request to prevent search results related to a web document. Further, a history of previous submissions for requests from the user to prevent one or more search results can be utilized as a signal to determine whether to grant or deny a request. For example, a user that has submitted 20 requests, of which all were granted, may be more likely to have a future request granted than a user that is submitting a first request and/or a user that has submitted 20 requests that were all denied.

As an example of utilizing a rules-based approach to determine whether to grant a request from a user, a request can identify a particular search result for Document A and the request can also indicate that Document A includes a phone number and address of the user. As an initial condition, Document A can be reviewed to determine whether it is a document that should include such information and/or is otherwise a document serving a legitimate public interest. For example, the request can be automatically denied if Document A is from a ".edu" or ".gov" domain. Also, for example, the request can be automatically denied if Document A is from a domain that has an interest in providing an address and/or phone number of the user (e.g., a directory of a business, contact information for a website, a news story). If Document A is not part of a domain that is flagged as one where requests are automatically denied, the request can be further processed to determine whether to grant the request. Similarly, in instances where Document A is part of a known spam website, the request can be automatically granted without further processing.

Next, account information of the user can be automatically processed to determine whether to grant the request to prevent search results related to Document A. For example, requests may only be automatically granted in instances where an account is older than 48 hours to prevent a user from making a fake account and requesting the prevention of particular search results that are for a different user. Also, for example, the information associated with the account can be reviewed to determine how recently the information has changed. In instances where account information has recently been changed (e.g., within the last 48 hours, last 24 hours, or other temporal threshold), the request may not be automatically granted even if Document A includes the alleged information asserted by the user.

If the account information indicates that the Document A includes the information alleged by the user and that the account information of the user has been stable (i.e., the same for at least a period of time), the account may be further checked to determine a history of how often the user has requested other search results be prevented from being provided. Also, for example, the account may be checked to determine how many requests resulted in being granted and/or denied.

If the request passes one or more checks successfully, search results for the particular search query can be prevented from being provided for future submissions of the search query. In instances where the request does not pass one or more checks, the request can be sent to one or more other client devices for further manual review. For example, if a request has been sent by an account that is newly created (e.g., an account that has been created in the last 48 hours), the request can be provided to a client device whereby a human reviewer can assess the request and determine whether to grant or deny the request. In some implementations, additional information can be requested from the user to assist a human reviewer in determining whether to grant or deny the request.

In some implementations, rules or other checks that are utilized to determine whether to approve or deny a request can be utilized in a particular order based on particular checks being more indicative of automatic approval or denial than other checks. For example, when determining whether to approve or deny a request, the domain of the web document may first be checked to determine whether it is a public interest website. If it is, the request can be automatically denied without performing any other checks. If it is not, then other checks can be performed. In instances where one check tends to result in a better categorization of the request as appropriate to approve or deny, that rule can be checked before other rules that are less indicative of categorization success. For example, where historical data indicates that a first rule is the cause of 35% of request denials and that a second rule is the cause of 15% of request denials, the first rule can be utilized prior to the second rule. Over time this can result in an overall lesser quantity of utilizations of both the first and the second rules, in view of the first rule being the cause, historically, of a greater percentage of request denials.

In some implementations, determining whether to prevent search results related to a web document from being provided in response to one or more search queries can include using one or more machine learning techniques. For example, a machine learning model can be utilized to process, as input, a request vector that includes information related to the search query, the particular search result that is related to a web document, and/or information related to the account of the user, as previously described with regards to utilizing a rules-based approach.

Machine learning model output can be generated based on processing the input vector. The output can, for example, indicate a likelihood to grant and/or deny the request. For example, the machine learning model output can be a numerical value between 0 and 1, with 0 being the highest likelihood of denial and 1 being the highest likelihood of granting the request. In instances where the machine learning model output can include values in a range, such as values that are between 0 and 1 (e.g., 0.50, 0.67, 0.22), thresholds can be set to determine whether to automatically deny the request or to automatically grant the request. For example, an upper threshold can be set that, if satisfied, results in automatic approval of the request. Further, a lower threshold can be set that, if satisfied, results in automatic denial of the request. Requests having generated values that fall between the upper and lower thresholds can be sent to one or more client devices for further review and whether the request is approved or denied can be contingent on feedback from reviewer(s) performing the further review.

As an example, a user can request that Document B be prevented from being provided in response to submission of Query B. Document B and Query B, along with information related to the account of the user, can be processed using a trained machine learning model to determine whether to grant or deny the request. For instance, output can be generated based on the processing, compared to threshold (s), and automatically approved, automatically denied, or provided for manual user review in dependence on the comparison. Initially, a low threshold may be set at 0.25 (i.e., request vectors provided to the machine learning model that result in the machine learning model providing, as output, a numerical value that is less than 0.25 will be automatically denied). Similarly, a high threshold value of 0.75 may be set, indicating that output values above that high threshold will be automatically granted. The request vector, which may include Document B, Query B, and account information of the user, can be processed using the machine learning model. If the output generated based on the processing using the machine learning model is 0.15, the request can be automatically denied. If the output is 0.85, the request can be automatically granted. If the output is 0.55, the request can be provided to one or more computing devices for further manual review.

In some implementations, the results of manual review can be utilized as training data for the machine learning model to continue to improve the accuracy and/or robustness of the machine learning model. For example, once a manual reviewer (or multiple reviewers) makes a determination for a request, the request vector for that request and the determination of the manual reviewer can be utilized to generate a supervised training example. That supervised training example (and additional similarly generated supervised training examples) can be utilized in further training the machine learning model. In instances where the request is sent to multiple reviewers, each review can independently determine whether to deny or approve the request, and the request can be approved or denied based on the consensus of the reviewers.

In some implementations, thresholds set for automatically granting and/or denying requests can be refined based on the determinations of manual reviewers. For example, assume a low threshold of 0.25 has been set for automatically denying requests and a high threshold of 0.75 has been set for automatically granting requests. As requests are provided as input to the machine learning model, those requests that result in output between 0.25 and 0.75 are sent for manual review. The resulting granting and/or denial of those requests, by manual reviewers, can be utilized to adapt the thresholds over time, thus resulting in fewer requests being sent for manual review while ensuring the accuracy of the automatically granted and/or denied requests. For example, multiple requests provided to the machine learning model may result in output between 0.25 and 0.33 and, based on the low threshold of 0.25, can be sent for manual review. Of the requests with output in that range that are sent for manual review, 99% of them may be denied. In response to the manual review indicating that 99% (or other threshold rate) of the requests having output between 0.25 and 0.33 are denied, the low threshold value can be changed to 0.33 (or 0.30 or other value greater than 0.25). This can result in outputs that fall below the new low threshold being automatically denied, thereby reducing the number of requests that are sent to client devices for manual review in the future. Additionally or alternatively, if a threshold percentage of requests that fall below a current high threshold but above a potential new threshold are ultimately granted by manual reviewers, the current high threshold can be changed to the potential new threshold. This can increase the quantity of requests that are automatically approved, while ensuring accuracy of those automatic approvals and reducing the number of requests that are provided for manual review.

In some implementations, a hybrid approach can be at least selectively utilized to determine whether to prevent search results from being provided in response to one or more search queries. For example, a request to prevent a particular search result from being provided may first be checked to determine whether the corresponding web document is part of a public interest website and/or whether the web document is part of a known spam website. In the case that the request is related to a web document that is part of a public interest website, as previously described, the request can be automatically denied. If the web document is not part of a public interest website, the request can be provided to the machine learning model and the output of the machine learning model processed as previously described. Also, for example, in instances where the web document is part of a known spam website, the request can be automatically granted without providing the request to the machine learning model. Thus, computing resources can be conserved by first checking whether one or more conditions are met and only processing requests utilizing the machine learning model when the initial rule(s) do not result in an automatic grant or denial.

In some implementations, results of either a rules-based approach and/or a machine learning approach can be utilized in generating training data for the machine learning model. For example, initially a rules-based approach can be utilized and the results of either automatic denials and/or grants of requests, as well as the results of requests that underwent manual review can be utilized in generating supervised training data for the machine learning model. The machine learning model can be optionally trained in parallel with the rules-based approach until such time that the machine learning model has been provided enough training data and is trained to perform as well as, or better than, the rules-based approach. Subsequently, at least a portion of the rules-based approach may be replaced by the machine learning model and/or continued to be run in parallel with the machine learning model.

In some implementations, once it is determined that a request be granted, an extent of prevention of search results can be determined. The extent to which search results can be prevented from being provided in response to one or more further queries can include identifying other queries in which a search result includes the web document indicated by the request. For example, the user can initially have indicated that a query of "John Smith social security number" resulted in a search result for Document A. Subsequently, other search queries can be identified that result in a search result of Document A, such as "John Patrick Smith personal information," "John Smith SSN," and/or "John P. Smith social." Thus, the additional queries can be provided to the user for the user to inspect and determine whether the search results of those additional search queries should be prevented. Also, for example, the user can be provided a notification that other queries have been reviewed and the search results are being prevented for instances related to Document A.

In some implementations, the extent of determining whether to prevent one or more search results can include identifying other queries, in addition to the search query provided with the request, to prevent search results for the web document. In some implementations, a rules-based approach can be utilized to determine related searches and check those searches to determine whether the search results include a search result related to the web document indicated in the request. For example, the query included in the request can be manipulated, using one or more rules, to generate additional similar queries, such as removing one or more search terms, rearranging the search terms, replacing one or more search terms with a synonym, etc. Thus, for a search query of "John Patrick Smith social security number," queries of "John P. Smith SSN," "John Patrick Smith SSN," "John Smith social," and "John Smith personal information" may be identified so that search results for those queries do not include a search result related to the web document indicated by the user's request.

In some implementations, the search query included in the request can be embedded as a vector in an embedding space that includes embeddings of other search queries. For example, a search query of "John Patrick Smith social security number" may be provided with a request and the search query can be utilized to generate a vector in an embedding space. Additional queries that have embeddings within a threshold distance of the embedded vector may also have search results related to the web document of the request prevented from appearing when those search queries are submitted. This can be performed proactively (e.g., identifying the search queries in the proximate embedding space) or in an ad hoc manner (e.g., as search queries are provided, checking if a vector generated from the new search query is within a threshold distance of an embedded vector). In either instance, those similar search queries, when submitted to the search engine, will be prevented from having a search result related to the web document and/or to similar web documents, as described herein. Accordingly, in various implementations, instead of or in addition to identifying explicit additional search queries for which prevention should also apply, an embedding distance from an embedding of a search query of a request can be identified— and prevention can also be applied to any additional search query that has a corresponding embedding within the embedding distance of the embedding of the search query. An embedding distance can be based on output from a machine learning model so that, for example, a search query wherein the machine learning model has determined, with 0.95 certainty that the request should be approved may have an embedding distance that is greater than, for example, a search query that was approved with generated output from the machine learning model of 0.85.

In some implementations, determining the extent to which search results are prevented from being provided in response to one or more queries can include determining whether additional web documents include substantially the same or similar information and preventing search results related to those web documents from being provided in response to the initial search query and/or other search queries. For example, the user can submit a request to prevent search results related to Document A from being provided in response to submission of a search query of "John Patrick Smith SSN." Once the request has been granted, other documents that are similar to Document A may be identified and the search results for the search query of "John Patrick Smith SSN" can then exclude both Document A and any other identified similar web documents. Thus, a nefarious actor cannot circumvent the prevention process by creating a new document with the same information and/or creating multiple versions of the same web document in an effort to ensure that the web document(s) appear in search results.

In some implementations, once a request has been granted and search results related to one or more documents have been prevented from being provided in response to one or more search queries, new web documents can be inspected to determine whether to prevent search results related to those web documents from being provided in response to any additional search queries. For example, as new web documents are identified for indexing, a new document can be inspected to determine whether it includes the same information as a web document that has been previously prevented from appearing in search results. In the instance that the new web document includes the same information or substantially similar information as a web document that was included with a previous granted request, the new web document may not be indexed by the search engine, thereby limiting access to the new web document. Also, for example, the new web document may be indexed, but flagged as a web document that should not be provided in particular search results, thus also limiting access to the new web document.

The above description is provided as an overview of some implementations of the present disclosure. Further description of those implementations, and other implementations, are described in more detail below.

DETAILED DESCRIPTION

Figure 1:
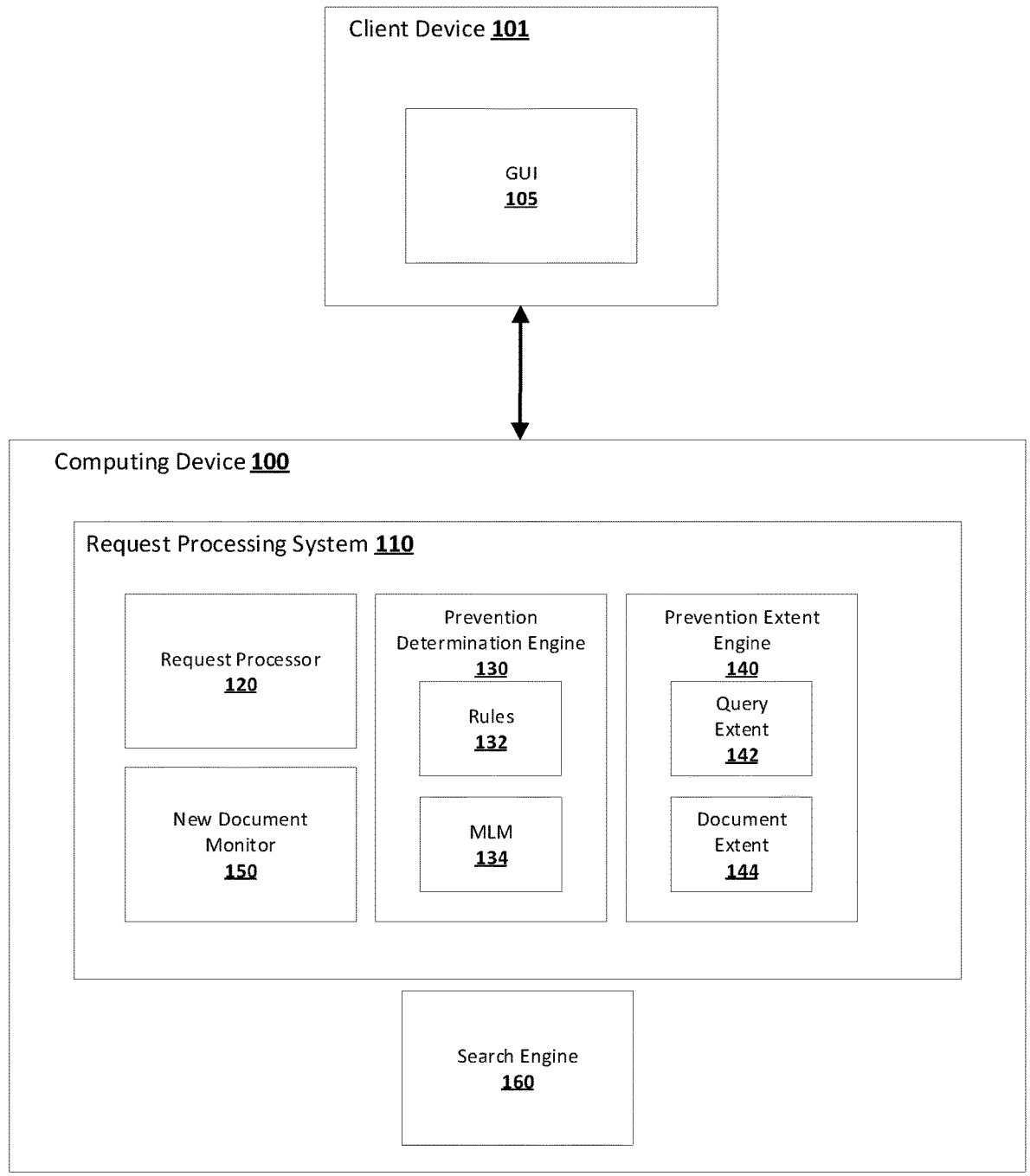
FIG. 1 illustrates an environment in which implementations described herein can be implemented.

Referring to FIG. 1, an example environment is illustrated in which implementations described herein can be implemented. The environment includes a client device 101 and a computing device 100. The client device 101 and computing device 100 can be in communication via one or more communication protocols, such as via the internet. Client device 101 is executing a graphical user interface 105, which may include a browser executing on the client device 101. Computing device 100 is executing the request processing system 110 which includes a plurality of modules. In some implementations, one or more of the modules can be omitted and/or one or more additional modules can be included in a request processing system 110.

In some implementations, GUI 105 can be utilized to provide a user with search results that are generated by search engine 160. For example, a user may be provided with an interface via GUI 105 that includes a form whereby the user can provide a search query. The search query can be provided to search engine 160, which can determine one or more search results that are responsive to the query. For example, referring to FIG. 2A, an interface 200A is illustrated that includes two search results 205A and 210A. The interface 200A further includes a snippet of the information included in a web document for each of the search results 205A and 210A. For example, 206A includes information that is included on a first webpage (i.e., a "personalinformation.com" web document that includes the terms "John was born in 1978 . . . , etc.) and snippet 211A includes information that is included on a second webpage (i.e., a "wikipedia.com" web document that includes the terms "John Smith was an English soldier . . . ," etc.). In some implementations, search engine 160 may provide, in response to a submitted search query, any number of search results which may each optionally include a snippet of a web document.

In some implementations, each of the snippets may be from a portion of the related web document that is most relevant to the provided search query. For example, snippet 206A may be generated from the portion of the related web document that includes information most closely related to "John Patrick Smith contact information," the submitted query 215A. In some implementations, an alternate search query can be provided to search engine 160, which can provide search results that are for the same web document as the search query "John Patrick Smith contact information," but the provided snippet may be of a different portion of the web document. For example, the web document that is related to search result 105A may be a directory of multiple names, phone numbers, and email addresses. For a search query of "Mary Jones personal information," a different snippet may be provided with the search result related to the same web document (e.g., a snippet of "Mary was born in 1974 . . . ," which is also included in the same web document as snippet 106A).

For each of search results 205A and 210A, a clickable link 207A and 212A are provided. One or more of the links can be selected by the user to indicate an interest in preventing a search result related to a web document from being provided in response to submitted query 215A. For example, Document A may be associated with search result 205A and, by selecting link 207A, the user indicates an interest in preventing Document A from being provided as a search result upon subsequent submissions of submitted query 215A.

Figure 2A:
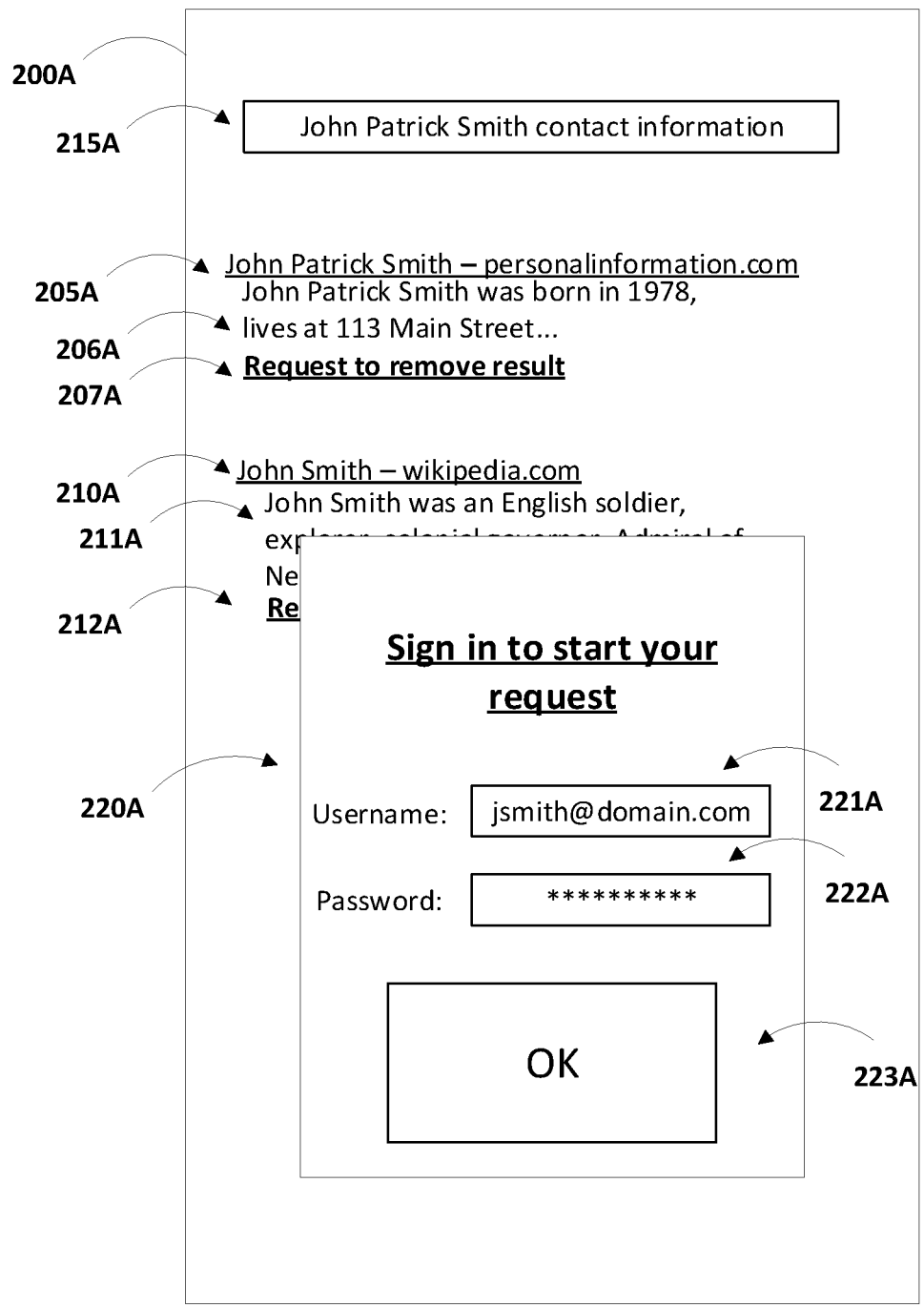
FIG. 2A illustrates an example interface that can be presented to a user to allow the user to generate a request to prevent search results from being provided in response to a particular search query.

Still referring to FIG. 2A, a pop-up window 220A is illustrated that may be provided via GUI 105 in response to the user selecting a link, such as link 207A. In some implementations, the pop-up window 220A can be omitted (e.g., the user is already signed into an account) and/or the pop-up window 220A can include alternate information. As illustrated, the pop-up window 220A includes a first text box 221A, whereby the user can enter a username for an account, and a second text box 222A, whereby the user can enter a password for the account. Pop-up window 220A also includes an "OK" button 223A, which can submit the username and password of the user to verify the account of the user.

Figure 2B:
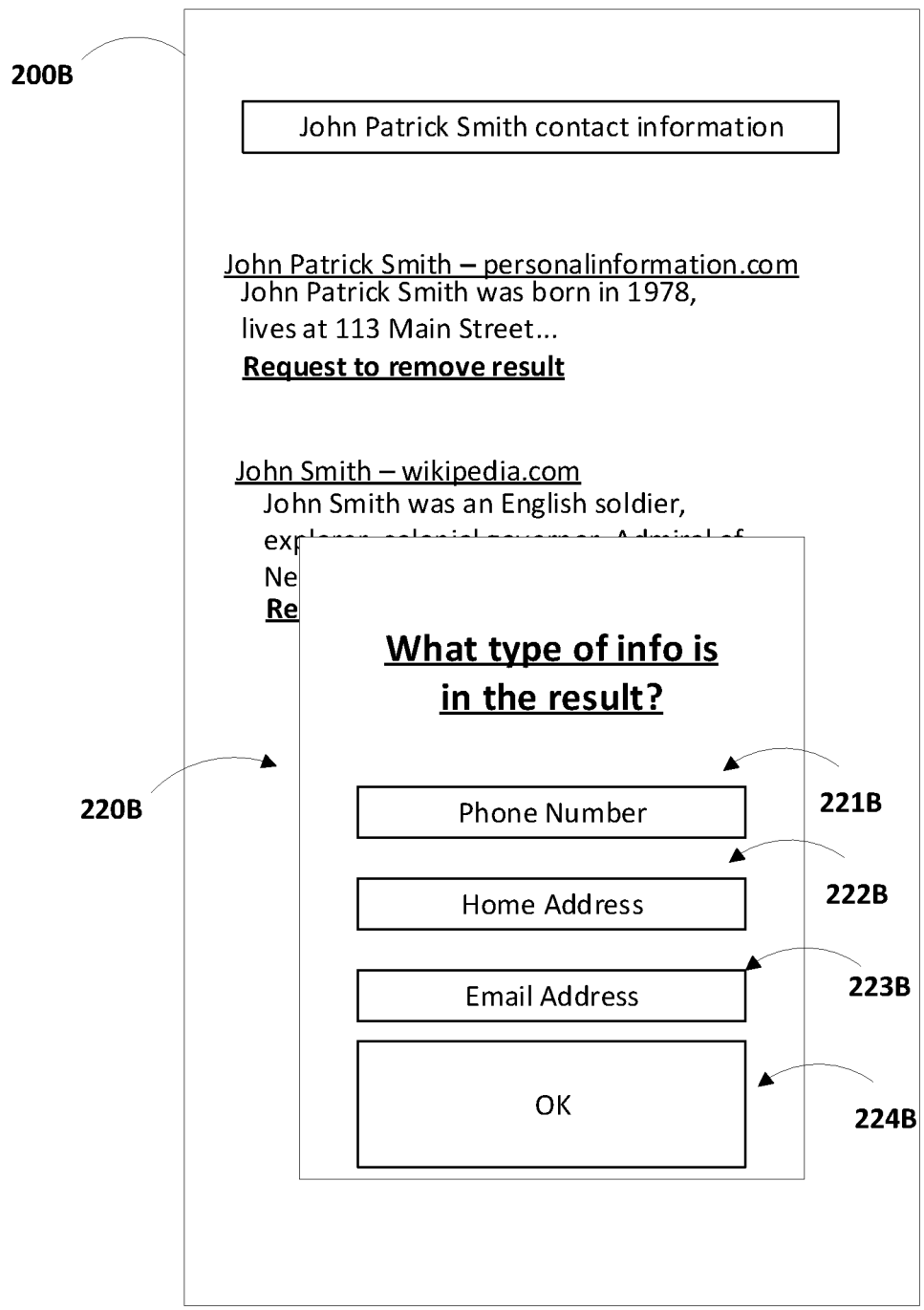
FIG. 2B illustrates another example interface that can be presented to a user to allow the user to generate a request to prevent search results from being provided in response to a particular search query.

Referring to FIG. 2B, an interface 200B is illustrated that may be provided via GUI 105. As illustrated, interface 200B includes some of the same information as interface 200A, but with a different pop-up window 220B. Pop-up window 220B includes phone number button 221B, a home address button 222B, an email button 223B, and a submission button 224B. In some implementations, the user can select one or more of buttons 221B, 222B, and 223B to indicate what personal information is included within the web document associated with search result 205B. For example, the user may select search result 205B and be directed to a web document. The user can review the web document and identify that the user's phone number and physical address appear in the web document. In response, the user can navigate back to interface 200A, select link 206A, enter credential information for the user account, and be provided with pop-up window 220B. The user can then select the phone number button 221B and the home address button 222B, then submit the request by selecting the submission button 224B.

Figure 2C:
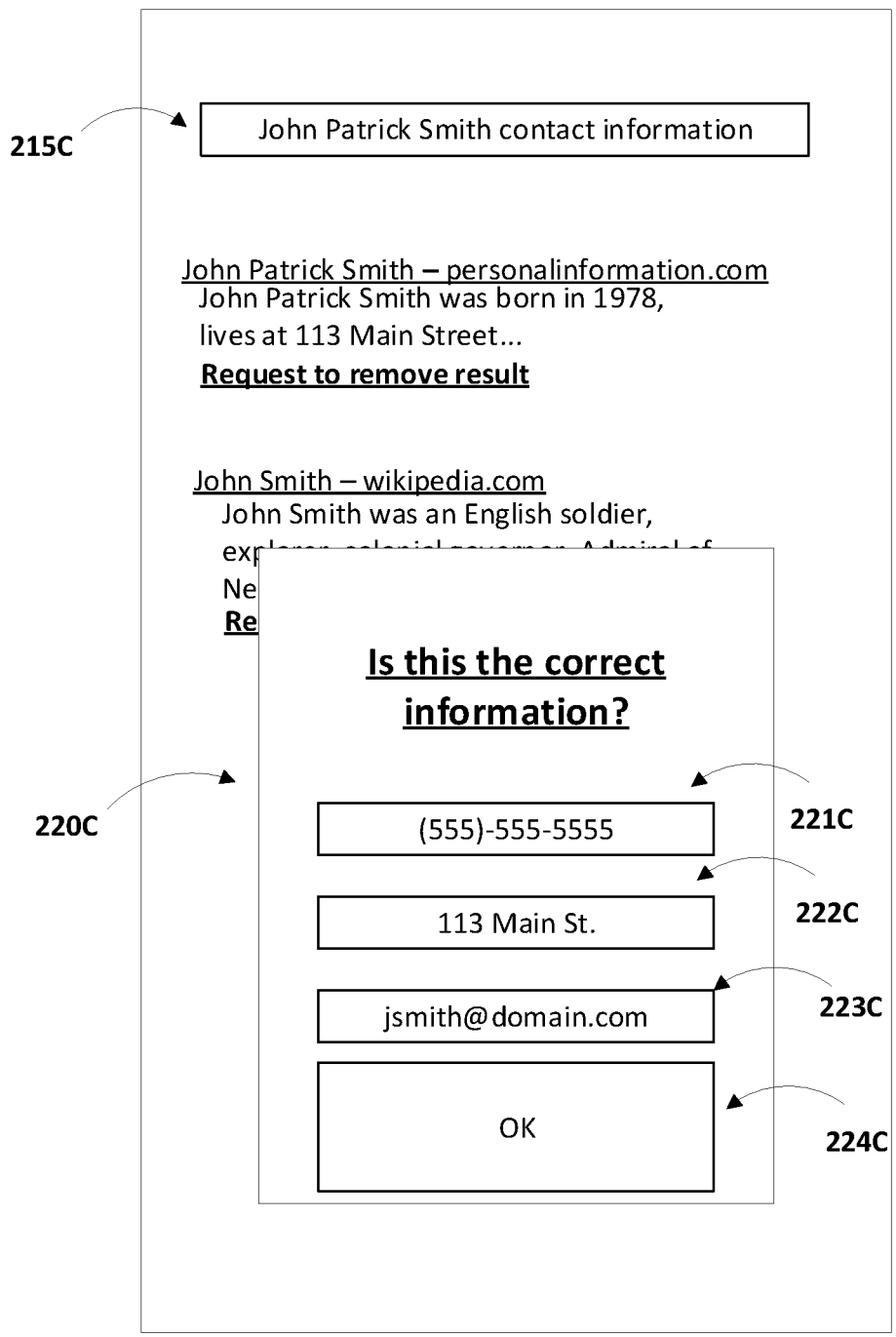
FIG. 2C illustrates yet another example interface that can be presented to a user to allow the user to generate a request to prevent search results from being provided in response to a particular search query.

Referring to FIG. 2C, another interface is illustrated that includes a pop-up window 220C. Pop-up window 220C includes a phone number text box 221C, a home address text box 222C, and an email text box 223C. The user can verify that the information included in the text boxes is accurate, and change any information that is outdated or incorrect. Once the correct information is entered, the submission button 224C can be selected to submit the request to have the document associated with search result 205C prevented from being provided when search query 215C.

Referring again to FIG. 1, once a user has submitted a request, the request can be provided to the request processor 120. The request can include the search query that was entered by the user (e.g., search query 215A of FIG. 2A), the search result (e.g., search result 205A), the web document associated with the search result, account information of the user (e.g., the information included in text boxes of FIG. 2C), and the information indicated in FIG. 2B that the user alleges is included on the web document associated with search result 205A. In some implementations, request processor 120 may initially check the web document to ensure that the web document includes the information alleged by the user (i.e., the information included in the request). In the instance that the web document does not include the information, request processor 120 can automatically reject the request.

In some implementations, request processor 120 can provide prevention determination engine 130 with at least a portion of the request. For example, request processor 120 can generate a request vector that includes the search query that was provided by the user, the particular search result that the user has interest in having prevented from being provided, the underlying related web document, and/or account information of the user. Prevention determination engine 130 can then determine, based on the information provided by the request processor 120, whether to grant the request to prevent the particular search result from being provided in response to subsequent submissions of the search query.

As an example, the user can submit a search query of "John Patrick Smith personal information," and, in response, the search engine 160 can provide a search result that is related to a web document that includes a phone number and address. The user may submit a request, as previously described with regards to FIGS. 2A-2C, to prevent the search result from being provided. The request can be provided to request processor 120, which can generate a request vector and provide the request vector to prevention determination engine 130. Prevention determination engine 130 can then determine whether to grant the request, deny the request, or provide the request to one or more other computing devices for manual review of the request.

Figure 3:
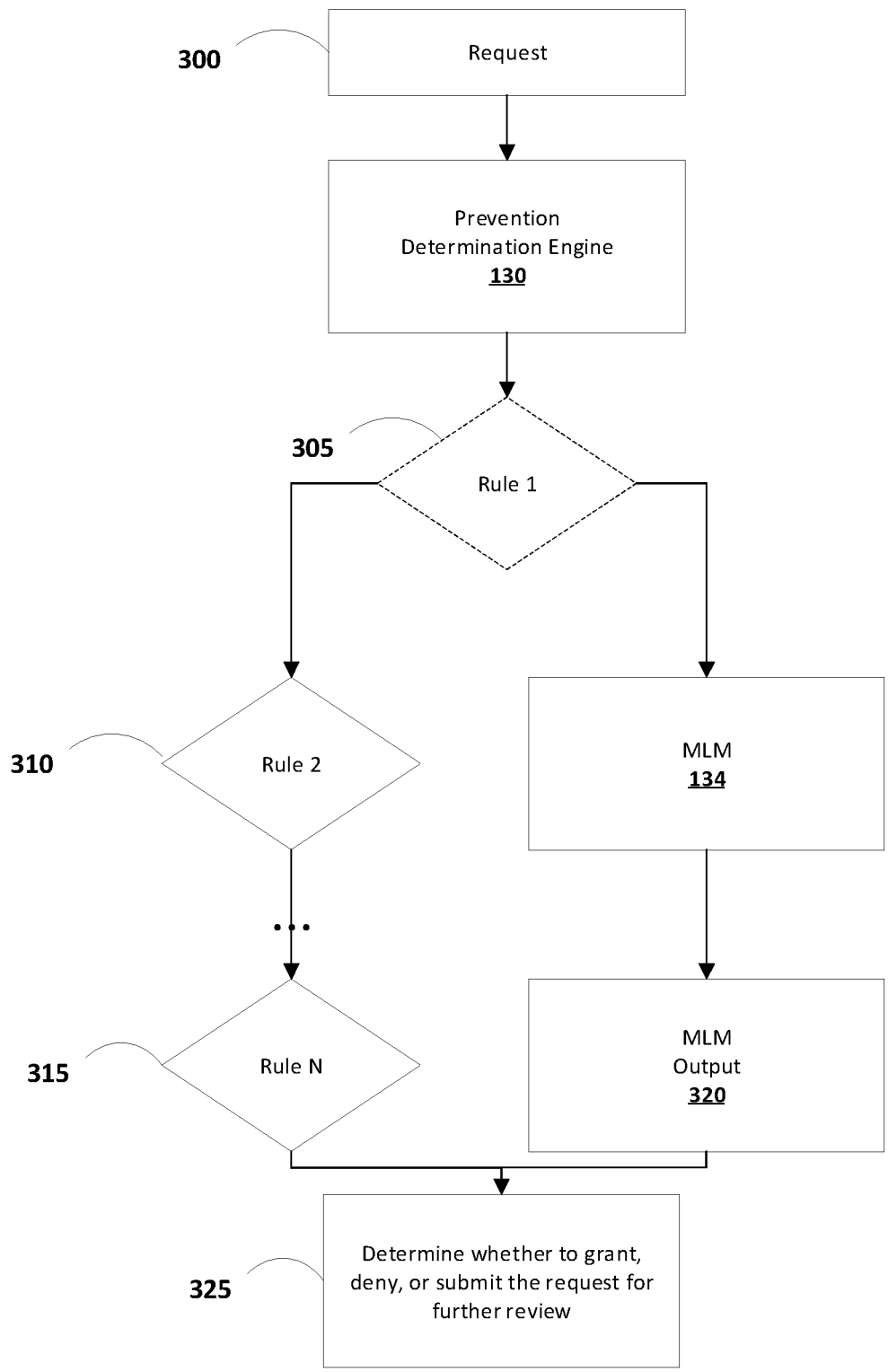
FIG. 3 illustrates a flowchart of a method for determining whether to grant or deny a request to prevent a search result from being provided in response to a search query.

Referring to FIG. 3, a flowchart is provided that illustrates a method for determining whether to approve or deny a request to prevent a search result from being provided in response to a search query. In some implementations, the method illustrated in FIG. 3 can be performed by one or more components that share characteristics with prevention determination engine 130. Prevention determination engine 130 can determine whether to grant the request, deny the request, or determine that the request should be manually reviewed.

Initially, the request 300 is provided to the prevention determination engine 130. The request can include the search query that was submitted by the user, the search result that the user has interest in being prevented from being provided, account information of the user, and/or other information regarding the request. In some implementations, the request can be a request vector that is generated by the request processor 120.

Prevention determination engine 130 can then perform at least one of two methods to determine whether to grant the request, deny the request, or send the request for further manual review. As illustrated, prevention determination engine 130 can apply any number of rules (e.g., Rule 305, Rule 310, Rule 315 . . . ). As illustrated, Rule 1 (305) is an optional rule that may or may not be checked in the process. Thus, for each of the rules that are available to the prevention determination engine 130, at least one of the rules may not be utilized for one or more requests.

Figure 4:
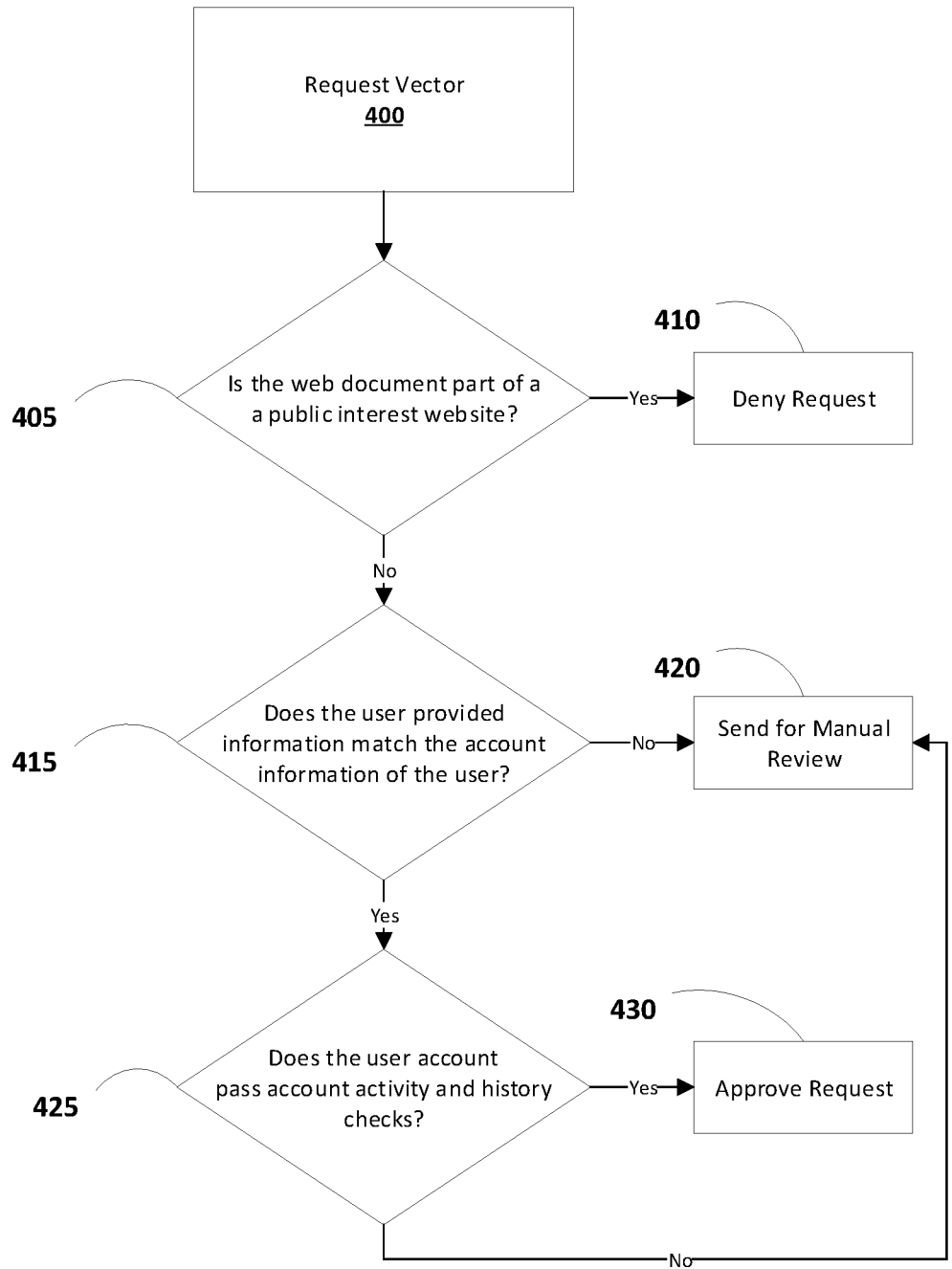
FIG. 4 illustrates a flowchart of a rules-based approach for determining whether to grant or deny a request to prevent a search result from being provided in response to a search query.

As an example, prevention determination engine 130 can utilize one or more rules 132 to determine whether to grant or deny the request. Referring to FIG. 4, a flowchart is provided that illustrates a method for determining whether to grant a request, deny a request, and/or to send the request for further review. The request vector 400 is received from the request processor 120, which can include the search query, search results, the web document, account information, and/or other information related to the request. Subsequently, a series of rules can be applied to the request to determine whether to grant the request, deny the request, or send the request for further manual review.

Rule 405 checks the domain of the web document that is included in the request to determine whether the search result is for a public interest website. For example, prevention determination engine 130 can determine whether the domain of the web document is one where requests have been determined to be improper and automatically denied. This can include a set of domains that are known to include public information that has a legitimate purpose for being publicly displayed (e.g., a ".edu" website, a ".gov" website). Further, rule 405 can determine whether the web document is part of another website that has been determined is trusted, such as a news website. In instances where the request is to prevent a search result for a public interest website or a trusted website, the request is denied 410. In some implementations, the web document of the request can be checked for other statistics to determine whether to automatically deny the request. For example, the website can be checked to determine how many views it has (e.g., views over a threshold number may be automatically rejected), whether the website has been previously listed or flagged as a unauthorized website (e.g., a website from a known nefarious actor), how recently the website has been created (e.g., newly created websites may be less likely to be rejected than websites that have been accessible for a longer period of time), and/or other measures of how likely a website is to be of legitimate interest to others.

At rule 415, the account information of the user is checked against the information that the user provided in the request as being included on the web document. For example, as previously described, the user can indicate what information is included in the web document that is related to the search result. As an initial step, prevention determination engine 130 (or request processor 120) can check the web document to determine what information is included in the web document. Further, as previously described, the user has the option to specify what particular information the user has interest in preventing from being provided in response to the search query.

As an example, a user can be logged into a user account when the user makes the initial request. The account of the user may include a phone number of the user, an address of the user, and/or an email address of the user. If the web document includes the information that is associated with the user account, rule 415 can be passed and the next rule applied. In instances where at least a portion of the account information does not match what is included in the web document and/or that the information asserted by the user (as provided via the interface of FIG. 2C) does not match the account information, the request can be sent to one or more computing devices for manual review 420.

At rule 425, the user account is checked to determine whether the past account activity and history indicate that the user request is likely valid or invalid. For example, the user account can be checked to determine how many requests have been made from that account to prevent search results from being provided in response to search queries. Thus, if a user has made 100 requests in the past month, the request may be more likely to be sent for manual review 420 than an user that has only made one request. In some implementations, the account can be checked to determine, for requests made using that account, how many of the requests have been successful. For example, a user account that indicates that 99% of the requests have been granted is more likely to be automatically granted than a second user account that indicates that 10% of requests have been granted. In the cases where the percentage (or number of) denied requests is above a threshold, the request can be sent to one or more computing devices for further review. Also, for example, where a request originates from a newly created account (e.g., an account less than 48 hours old), the request may be subject to further review 420. In the instances whereby all rules are passed successfully, the request can be automatically granted 430. However, in instances where at least one of the rules fails, the request can be sent to one or more computing devices for further review 420.

Referring again to FIG. 3, in some implementations, prevention determination engine 130 may utilize one or more machine learning models to determine whether to automatically grant or deny a request. As illustrated in FIG. 3, prevention determination engine 130 can first check the request using one or more rules 305 first to determine whether one or more criteria is met before utilizing the machine learning model 134. For example, rule 305 can be a rule that checks whether the web document is part of a public interest website. In the instance where it is part of a public interest website, the machine learning model 134 may not be utilized and instead the request can be automatically denied. However, in the instance where the web document is not part of a public interest website, the machine learning model 134 can be utilized to generate machine learning model output 320. The request vector 300 can be processed using the machine learning model to generate, as output 320, a numerical value that can be indicative of likelihood that the request should be granted and/or denied, at step 325.

Figure 5:
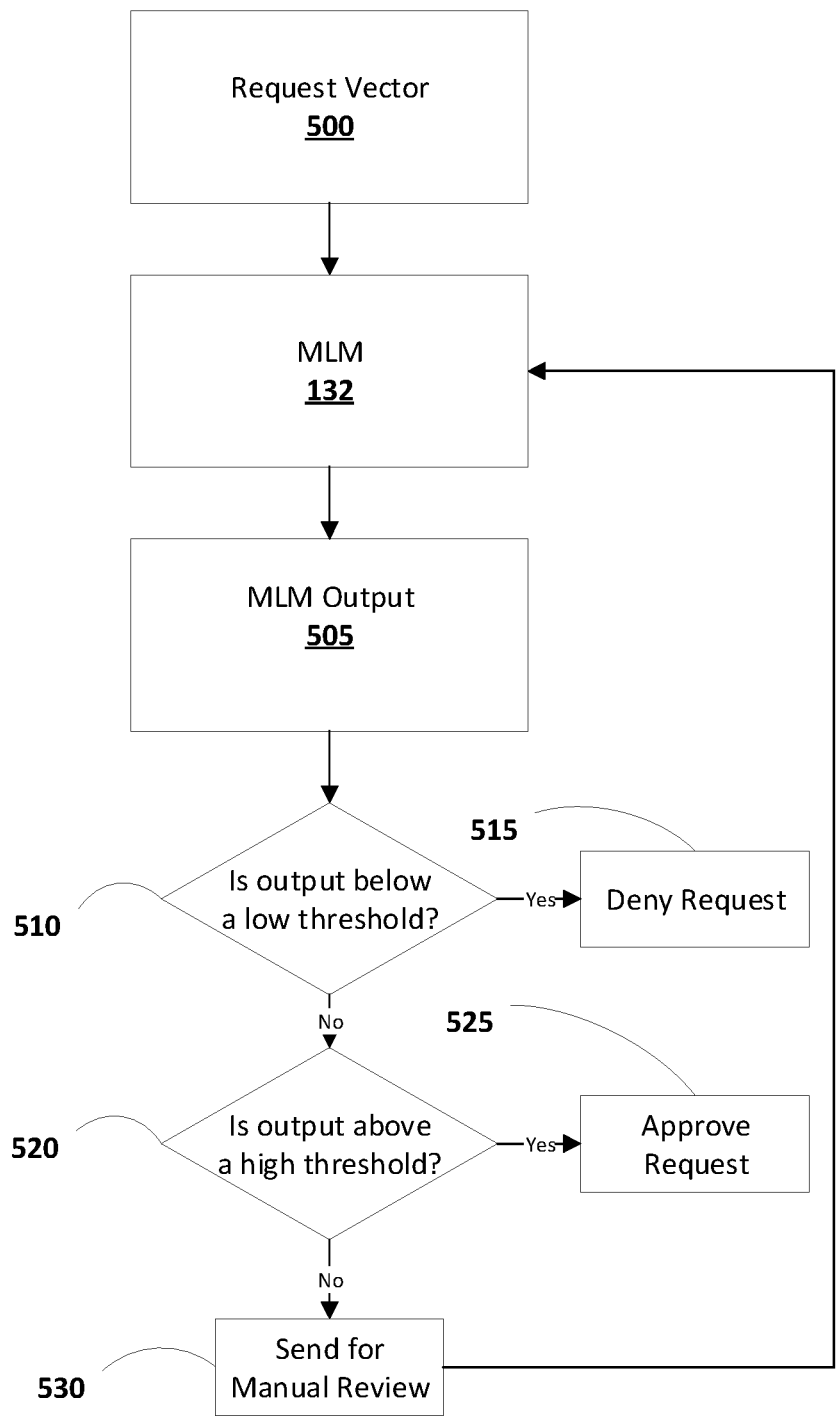
FIG. 5 illustrates a flowchart of a machine learning approach for determining whether to grant or deny a request to prevent a search result from being provided in response to a search query.

Referring to FIG. 5, a flowchart is provided that illustrates utilizing a machine learning model to generate output that can be used to determine whether to approve or deny a request to prevent a particular search result from being provided in response to a search query. The method illustrated can be performed by a component that shares one or more characteristics with prevention determination engine 130. The machine learning model 132 takes, as input, a request 300 from a user, which can be, for example, a request vector that includes a search result, a search query, and account information of the user (e.g., name, address, email address, how long the account has been active, previous request submissions by the user). In response, the machine learning model 132 generates output 505 that includes a numerical value between 0 and 1, with 0 indicating to automatically deny the request and 1 indicating to automatically approve the request.

At decision 510, the generated machine learning output 505 is checked to determine whether it is below a threshold value. For example, a low threshold value may initially be set as 0.25, and any machine learning model output that is below 0.25 can be denied at step 515. At decision 520, the generated machine learning model output 505 is checked to determine whether it is above a threshold value. For example, a high threshold value may be initially set as 0.75, and any generated output that is above 0.75 is approved at step 525.

In instances where the generated output falls between the low threshold and the high threshold, the request is sent to one or more client devices for manual review 530. The one or more client devices include an interface by which a manual reviewer can review the request and make a determination as to whether to approve or reject the request. In response, the reviewer can utilize the interface to send feedback regarding whether the request is approved or denied, and corresponding actions can be taken to prevent or bypass prevention of the search result from being provided in future submission of the search query.

In some implementations, additional information can be provided with the request for manual review. For example, in some implementations, at step 530, the client device can be provided at least a portion of the machine learning model output (e.g., confidence scores, raw output from the model) that can be reviewed by a human reviewer to assist in making a determination as to whether to grant or deny the request. Also, for example, sending the request for manual review can include providing account information of the requesting user (e.g., age of account, history of previous requests) to the client device to further assist the manual reviewer in making a determination as to whether to grant or deny a request.

Further, the results of the manual review can be provided to the machine learning model as training data to further refine the machine learning model 132. For example, a manual reviewer may determine that a request should be granted. The machine learning model 132 can be provided, as training data, the request and an indication of "grant" such that the machine learning model can be refined to, in the next instance of receiving a second request that is similar to the request, the second request be automatically approved at step 525.

Prevention extent engine 140 can determine an extent to which additional web documents and/or additional search queries are related to the request such that additional search results should be prevented from being provided in response to one or more search queries. Prevention extent engine 140 includes a query extent module 142 and a document extent module 144. The query extent module 142 can determine whether additional queries, when submitted, provide the particular search result in response to the search query. For example, a request can indicate that a search result for a web document was provided responsive to a search query of "John Patrick Smith bank account." If a search result for that query is related to Document A, which has sensitive information related to "John Patrick Smith," the request can be granted to cause prevention of provision of that search result for future occurrences of that query. Further, additional queries that also provide a search result for Document A in response to the query being submitted may also be identified (e.g., using an index that maps documents to queries to which they are responsive) and Document A can be prevented from being provided by those additional queries. For example, the query "John P. Smith bank account," "John Smith bank," and "John P Smith account information" may all provide a search result related to Document A. In response, a search result related to Document A can be prevented from being provided in response to one or more of those queries.

The document extent module 144 can determine whether other similar documents exist and whether to prevent search results related to those other web documents from being provided in response to one or more search queries. For example, a request to prevent search results for Document A may have been granted. Another web document, Document C, may be identified by the search engine (e.g., via web crawler and/or other techniques). Based on a request for Document A having been granted, Document C and Document A can be compared to generate a similarity measure that indicates how similar all or aspects of Document C and Document A are to one another. If it is determined, based on the similarity measure, that Document C includes information that is similar or the same as the information included in Document A (for which the request has been granted), Document C may be tagged as being prevented from being provided in response to one or more search queries (i.e., treated in the same manner as search results related to Document A). In some implementations, new web pages may be monitored after the request has been granted to identify similar documents. For example, as new documents are identified, they may be checked to determine similarity between the new document and documents that are the subject of a granted request. If a similarity above a threshold is identified, the new document may be flagged and/or may not be indexed by the search engine.

Figure 6:
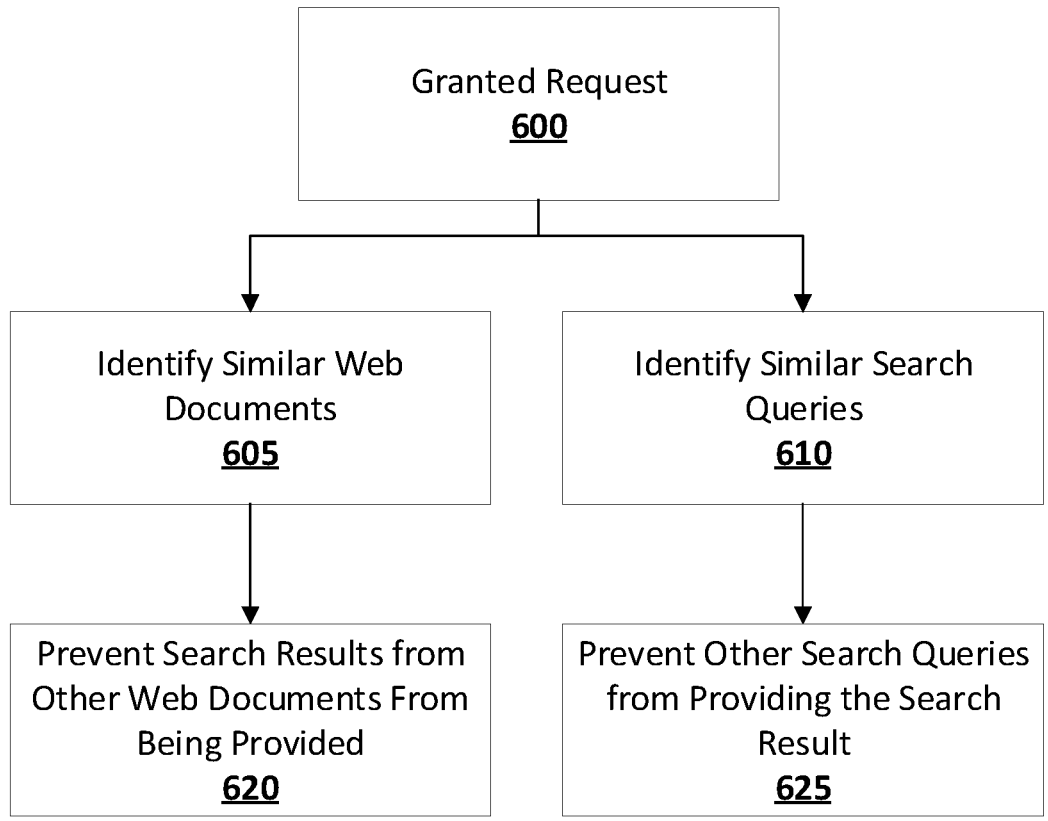
FIG. 6 illustrates a flowchart of a method of preventing other search results from being provided in response to one or more additional queries and/or from related web documents.

Referring to FIG. 6, a flowchart is provided that illustrates a method for preventing one or more documents from being provided in response to one or more additional search queries. A granted request 600 is received by extent determination engine 140 from prevention determination engine 130. The granted request 600 can include, for example, the search result, the related web document, and/or the search query that was submitted by the user. At step 605, similar web documents are identified. The similar web documents may be identified utilizing one or more methods described herein. For example, a web crawler may be utilized to identify documents and a similarity measure between the new web documents and the web document of the granted request can be compared. In instances where the similarity measure satisfies a threshold, the new web document can be flagged, at step 620, to prevent it from being provided with search results upon future submission of the search query (or related search queries that may be identified in step 610).

At step 610, similar queries can be identified that are related to the search query that was provided with the request. As previously described, in some implementations, one or more regular expressions can be utilized to identify alternate search queries that are related to the request search query. For example, the user may initially have indicated that a query of "John Smith social security number" resulted in a search result for Document A. Subsequently, other search queries can be identified that result in a search result of Document A, such as "John Patrick Smith personal information," "John Smith SSN," and/or "John P. Smith social." Thus, the additional queries may be provided to the user for the user to inspect and determine whether the search results of those additional search queries should be prevented.

Alternatively or additionally, similar queries can be identified that are related to the search query based on embedding the request search query in an embedding space. Other search queries that are within a threshold embedding distance to the search query can be identified as similar, and any search results for the web document can be prevented from being provided in response to any of the close queries being submitted. For example, an embedding distance can be based on an output from a machine learning model so that, for example, a search query wherein the machine learning model has determined, with 0.95 certainty that the request should be approved may have an embedding distance that is greater than, for example, a search query that was approved with generated output from the machine learning model of 0.85.

Figure 7:
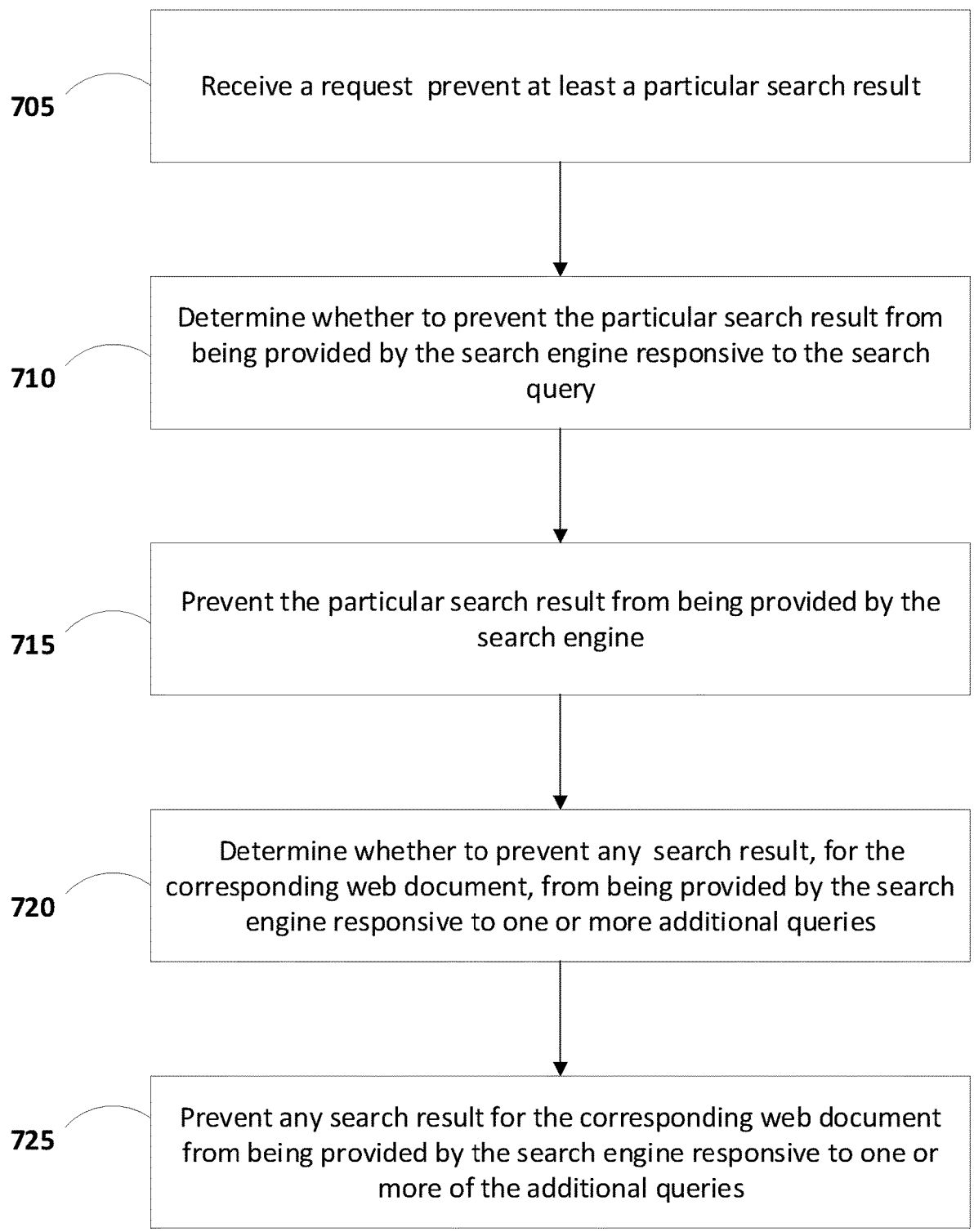
FIG. 7 illustrates a flowchart of a method for determining whether to prevent a search result from being provided in response to a search query and one or more additional search queries.

Referring to FIG. 7, a flowchart is provided that illustrates a method for preventing one or more particular search results from being provided in response to submission of a search query. In some implementations, one or more steps of the method can be omitted or combined, and/or one or more additional steps can be included in the method. The method can be performed by one or more components that are illustrated in the environment of FIG. 1.

At step 705, a request to prevent at least a particular search result from being provided in response to a search query is received. In some implementations, the request can include at least the search query that was submitted by the user, a particular search result for a web document that the user has interest in not being provided upon future submissions of the search query, and/or account information of the user. In some implementations, a user can generate a request utilizing one or more of the interfaces that are illustrated in FIGS. 2A-2C. For example, a user may utilize a search engine to submit a search query, identify one or more search results, and submit a request, while logged into a user account, to prevent the search result from being provided in response to future submissions of the search query. The request can be processed by a component that shares one or more characteristics with request processor 120 of FIG. 1.

At step 710, one or more components determine whether to percent the particular search results from being provided by the search engine responsive to the search query. In some implementations, the determination can be performed by a component that shares one or more characteristics with prevention determination engine 130. In some implementations, prevention determination engine 130 can determine whether to grant the request, deny the request, or to submit the request for further review utilizing one or more rules, as illustrated in FIG. 4. In some implementations, prevention determination engine 130 can determine whether to grant, deny, or submit the request for further review using one or more machine learning models, as illustrated in FIG. 5. In some implementations, prevention determination engine 130 can utilize one or more hybrid approaches whereby one or more rules are first utilized to make an initial determination of whether a request may be valid, and only provide those requests to a machine learning model that have passed the initial rule(s) successfully. For example, a request may first be checked to ensure that the web document of the request is not from a public interest domain. If it is, the request may be automatically denied. If it is not, the request may be further processed using a machine learning model, as illustrated in FIG. 3.

At step 715, if prevention determination engine 130 determines that the request should be granted, the particular search result is prevented from being provided by the search engine in response to future submissions of the search query that is included in the request. For example, a web document may be flagged as being prevented from results of future submissions of the particular search query. Thus, when another user submits the particular search query that was included with the request, the responsive search results will not include the particular search result (or another search result for the web document).

At step 720, one or more additional search queries can be identified that also, when submitted to the search engine, result in a search result related to the same web document. Step 720 can be performed by a component that shares one or more characteristics with prevention extent engine 140, particularly, query extent module 142. In some implementations, prevention extent engine 140 may utilize one or more techniques, such as utilizing regular expressions, to identify related search queries that can, when submitted, result in a search result related to the web document. For example, for a search query of "John Patrick Smith address," prevention extent engine 140 can identify "John Smith address," "John P. Smith address," "John Smith home address," and/or other queries that are related to the particular query of the request. In some implementations, prevention extent engine 140 can generate a vector representing the particular search query and embed the search query in an embedding space. Upon submission of another search query, the particular search results can be prevented for those queries that, when embedded in the same embedding space, are within a threshold distance to the vector representing the request search query. At step 725, prevention extent engine 140 prevents the additional search queries from providing the search result upon submission of one or more of the additional search queries.

Figure 8:
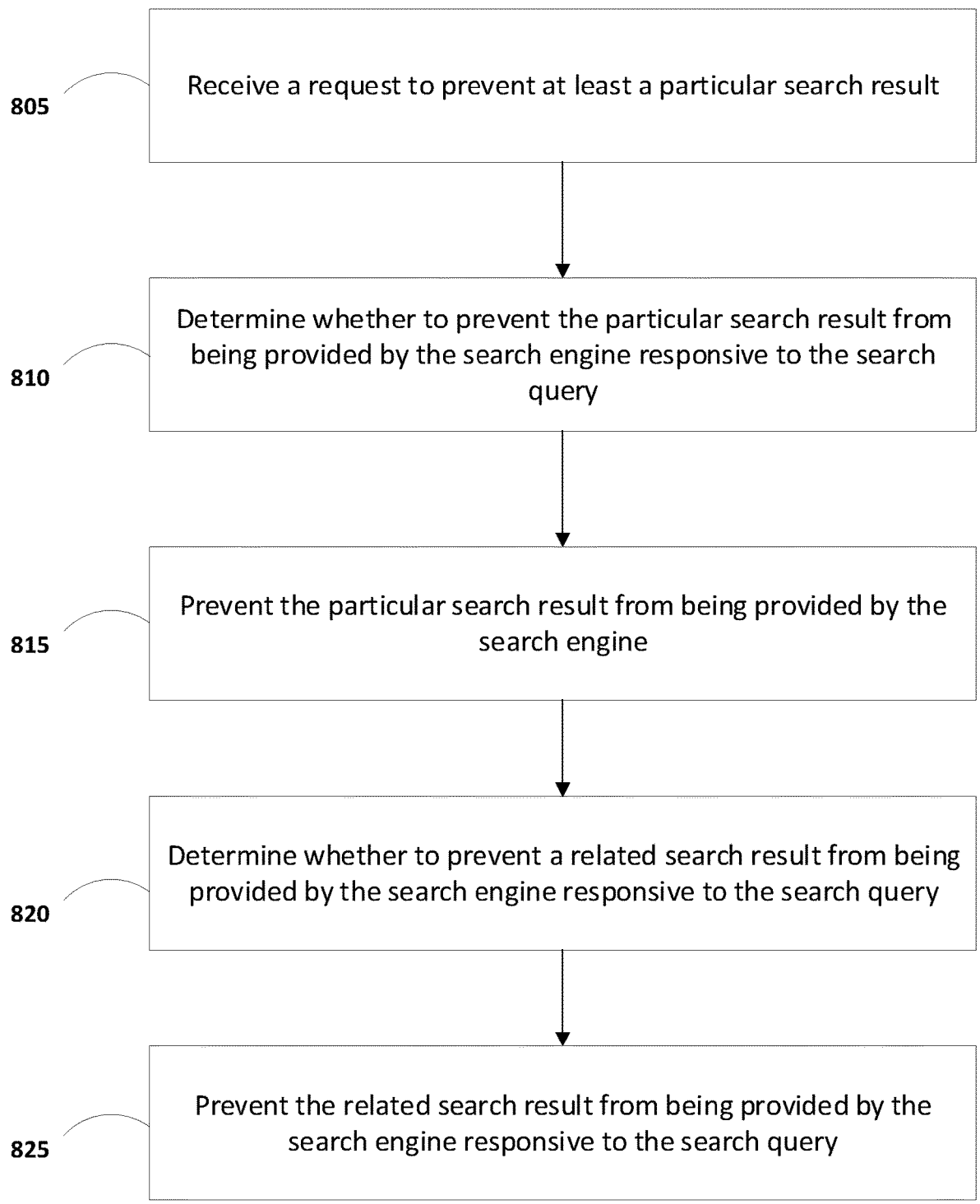
FIG. 8 illustrates a flowchart of a method for determining whether to prevent a related search result from being provided in response to a search query.

Referring to FIG. 8, a flowchart is provided that illustrates another method for preventing one or more particular search results from being provided in response to submission of a search query. In some implementations, one or more steps of the method can be omitted or combined, and/or one or more additional steps can be included in the method. The method can be performed by one or more components that are illustrated in the environment of FIG. 1.

At step 805, a request to prevent at least a particular search result from being provided in response to a search query is received. In some implementations, the request can include at least the search query that was submitted by the user, a particular search result for a web document that the user has interest in not being provided upon future submissions of the search query, and/or account information of the user. In some implementations, a user can generate a request utilizing one or more of the interfaces that are illustrated in FIGS. 2A-2C. For example, a user may utilize a search engine to submit a search query, identify one or more search results, and submit a request, while logged into a user account, to prevent the search result from being provided in response to future submissions of the search query. The request can be processed by a component that shares one or more characteristics with request processor 120 of FIG. 1.

At step 810, one or more components determine whether to percent the particular search results from being provided by the search engine responsive to the search query. In some implementations, the determination can be performed by a component that shares one or more characteristics with prevention determination engine 130. In some implementations, prevention determination engine 130 can determine whether to grant the request, deny the request, or to submit the request for further review utilizing one or more rules, as illustrated in FIG. 4. In some implementations, prevention determination engine 130 can determine whether to grant, deny, or submit the request for further review using one or more machine learning models, as illustrated in FIG. 5. In some implementations, prevention determination engine 130 can utilize one or more hybrid approaches whereby one or more rules are first utilized to make an initial determination of whether a request may be valid, and only provide those requests to a machine learning model that have passed the initial rule(s) successfully. For example, a request may first be checked to ensure that the web document of the request is not from a public interest domain. If it is, the request may be automatically denied. If it is not, the request may be further processed using a machine learning model, as illustrated in FIG. 3.

At step 815, if prevention determination engine 130 determines that the request should be granted, the particular search result is prevented from being provided by the search engine in response to future submissions of the search query that is included in the request. For example, a web document may be flagged as being prevented from results of future submissions of the particular search query. Thus, when another user submits the particular search query that was included with the request, the responsive search results will not include the particular search result (or another search result for the web document).

At step 820, prevention extent engine 140, particularly document extent module 144, determines whether additional web documents can include the same information or similar information as the web document that is related to the search result of the request, and prevent the similar web document(s) from being provided in response to one or more additional search queries (and/or the particular search query of the request). For example, a request to prevent search results related to a web document can be granted, and then one or more other web documents can be identified that include similar information (e.g., the name of the user, the address of the user, phone number, email address). In some implementations, the user may be provided with a notification indicating that additional web documents were identified that include similar or the same information as the web document that is related to the search result of the request, and, at step 825, search results related to the additional web documents can be prevented from being provided in response to the request search query and/or in response to submission of one or more additional search queries.

Figure 9:
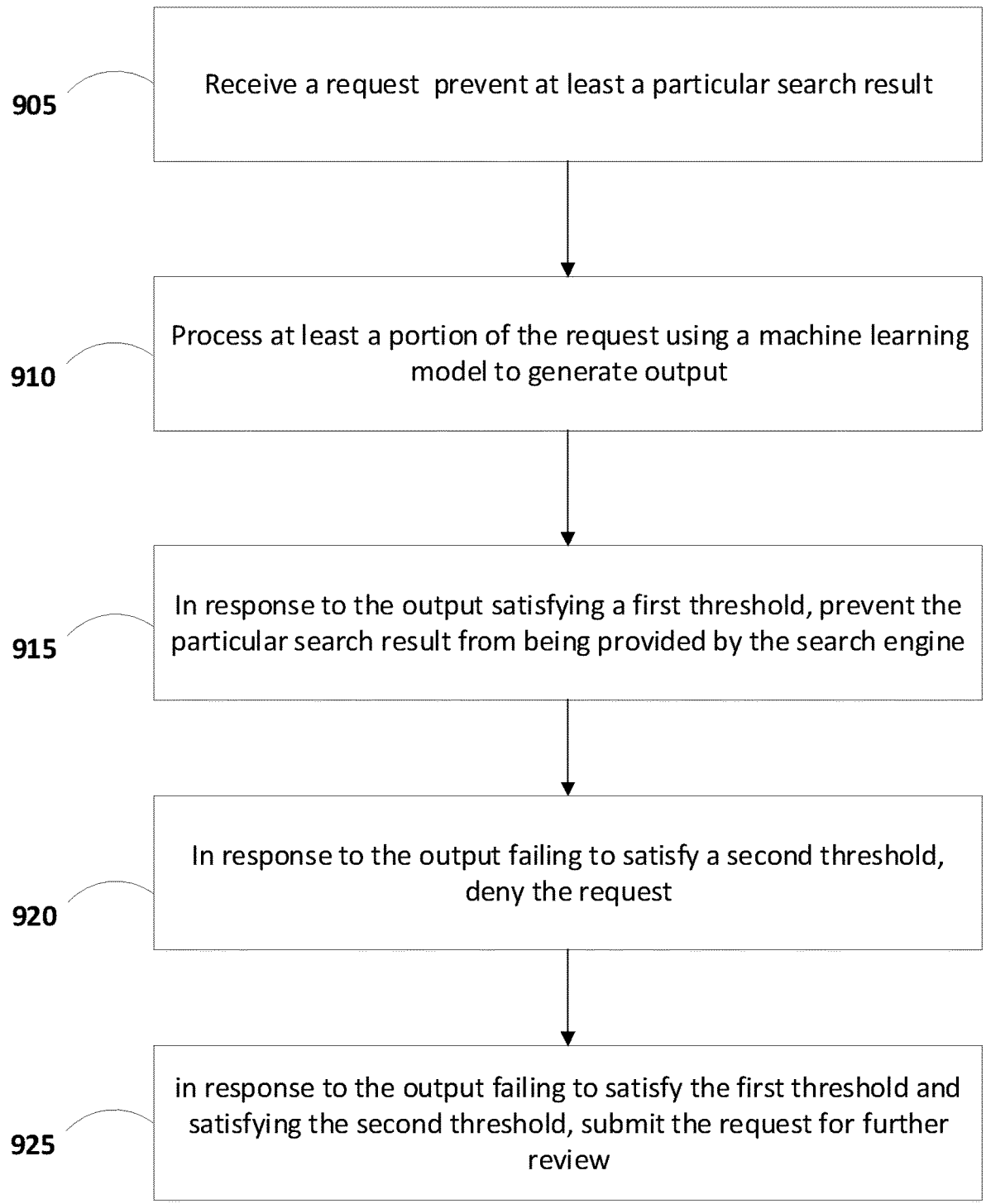
FIG. 9 illustrates a flowchart of a method of using a machine learning model to determine whether to approve, deny, or submit a request for further review.

Referring to FIG. 9, a flowchart is provided that illustrates another method for preventing one or more particular search results from being provided in response to submission of a search query. In some implementations, one or more steps of the method can be omitted or combined, and/or one or more additional steps can be included in the method. The method can be performed by one or more components that are illustrated in the environment of FIG. 1.

At step 905, a request to prevent at least a particular search result from being provided in response to a search query is received. In some implementations, the request can include at least the search query that was submitted by the user, a particular search result for a web document that the user has interest in not being provided upon future submissions of the search query, and/or account information of the user. In some implementations, a user can generate a request utilizing one or more of the interfaces that are illustrated in FIGS. 2A-2C. For example, a user may utilize a search engine to submit a search query, identify one or more search results, and submit a request, while logged into a user account, to prevent the search result from being provided in response to future submissions of the search query. The request can be processed by a component that shares one or more characteristics with request processor 120 of FIG. 1.

At step 910, the request is processed, using a machine learning model, to generate output. The request can be processed by a component that shares one or more characteristics with prevention determination engine 130, particularly the machine learning model module 134. In some implementations, the machine learning model is trained using supervised training instances that each include corresponding request parameters and a corresponding indication of whether the corresponding request was approved. For example, the machine learning model can be trained based on previous instances of requests that were received, manually reviewed, and a determination made by a reviewer. Thus, for example, a rules-based approach may be initially utilized, as described herein, and the results of the requests that were manually reviewed utilized to generate training data for the machine learning model.

At step 915, the particular search result is prevented from being provided by the search engine 160 in response to the output generated by the machine learning model satisfying a first threshold. For example, the machine learning model can generate a numerical value between 0 and 1, with 0 being an indication to automatically deny the request and 1 being an indication to automatically approve the request. Prevention determination engine 130 can determine whether the generated output from the machine learning model satisfies an automatic denial threshold. For example, prevention determination engine 130 can determine that any request that is processed by the machine learning model and that results in a generated output value that is greater than 0.75 be prevented from being provided in response to the search query (i.e., the request be granted).

At step 920, for the requests that were processed and the machine learning model generated output that is below a threshold, the request to prevent the search result from being provided is denied. For example, prevention determination engine 130 can determine that, for generated output that does not satisfy a threshold of 0.25, the request is automatically denied.

At step 925, in response to the output failing to satisfy the first threshold and satisfying the second threshold, prevention determination engine 130 can submit the request for further review. Submitting the request for further review can include, for example, providing the request to one or more computing devices that can be utilized by a manual reviewer to make a determination as to whether to grant or deny the request. The results of the manual review can then be utilized as training data for the machine learning model to further refine the performance in reviewing future requests.

In some implementations, thresholds that are utilized when performing the method of FIG. 9 can be adjusted based on the results of manual review of the requests that fall between the thresholds. For example, based on reviewing results of manual review, prevention determination engine 130 may determine that all requests that fall between 0.25 (i.e., the low threshold) and 0.30 have been denied. In response, the low threshold of 0.25 may be adjusted to 0.30 to reflect that those requests, upon manual review, have all been denied. Thus, as more manual review data is available, the machine learning model can be refined, as well as the interpretation of the results of the generated output, to reduce the number of requests that are provided to one or more computing devices for further review.

Figure 10:
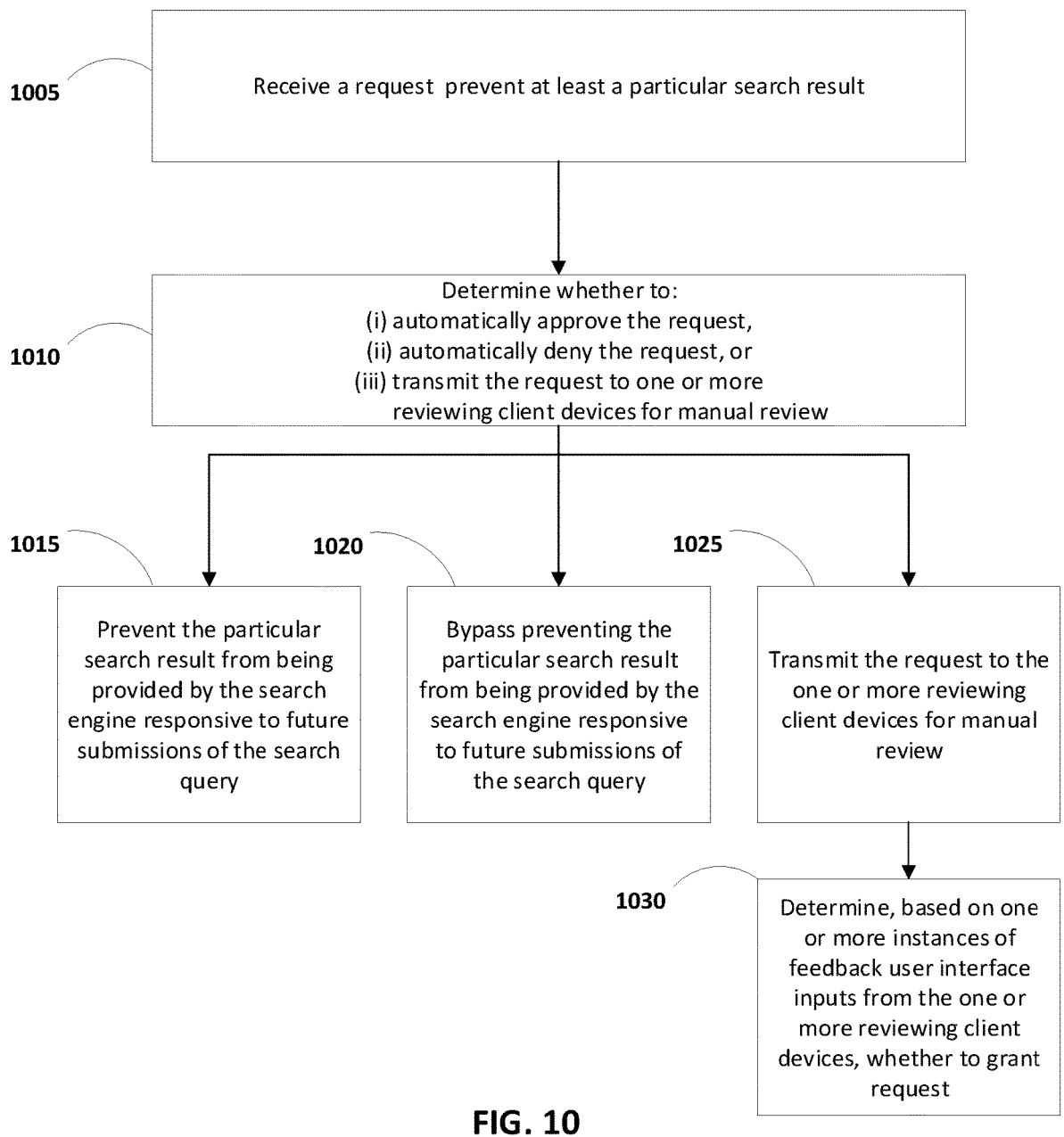
FIG. 10 illustrates a flowchart of a method for determining whether to approve, deny, or submit a request for further review.

Referring to FIG. 10, a flowchart is provided that illustrates another method for preventing one or more particular search results from being provided in response to submission of a search query. In some implementations, one or more steps of the method can be omitted or combined, and/or one or more additional steps can be included in the method. The method can be performed by one or more components that are illustrated in the environment of FIG. 1.

At step 1005, a request to prevent at least a particular search result from being provided in response to a search query is received. In some implementations, the request can include at least the search query that was submitted by the user, a particular search result for a web document that the user has interest in not being provided upon future submissions of the search query, and/or account information of the user. In some implementations, a user can generate a request utilizing one or more of the interfaces that are illustrated in FIGS. 2A-2C. For example, a user may utilize a search engine to submit a search query, identify one or more search results, and submit a request, while logged into a user account, to prevent the search result from being provided in response to future submissions of the search query. The request can be processed by a component that shares one or more characteristics with request processor 120 of FIG. 1.

At step 1010, prevention determination engine 130, or a component that shares one or more characteristics with prevention determination engine 130, determines whether to approve the request, deny the request, or transmit the request to one or more reviewing client devices for manual review. In some implementations, prevention determination engine 130 can utilize one or more rules 132 to determine whether to approve, deny, or transmit the request. In some implementations, prevention determination engine 130 can utilize a machine learning model to determine whether to approve, deny, or transmit the request. At step 1015, in response to prevention determination engine 130 determining to approve the request, the particular search result is prevented from being provided by the search engine responsive to future submissions of the search query, as previously described herein. At step 1020, in response to prevention determination engine 130 determining to deny the request, preventing the particular search result from being provided by the search engine responsive to future submissions of the search query is bypassed, thus continuing to allow the particular search result to be provided in response to the search query. At step 1025, in response to prevention determination engine 130 determining that the request should not be automatically approved nor denied, the request is transmitted to the one or more reviewing client devices for manual review. At step 1030, the request is granted or denied based on feedback from the manual reviewer via the reviewing client device(s).

Figure 11:
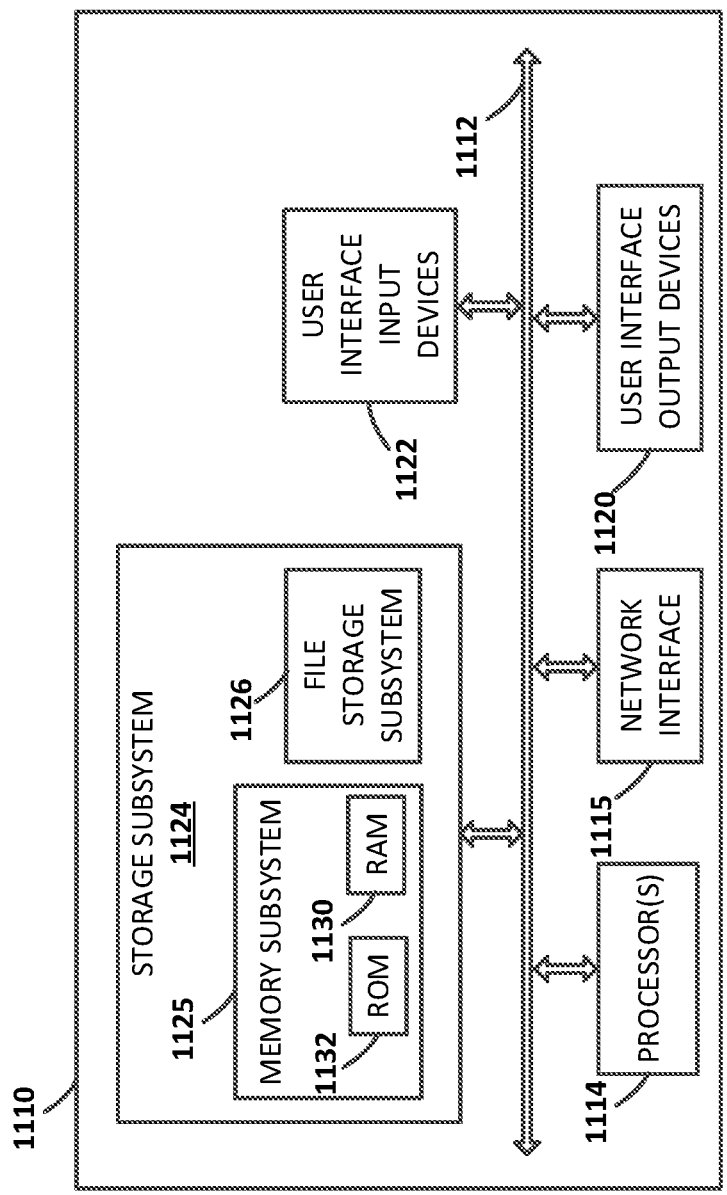
FIG. 11 illustrates an example architecture that can be utilized to implement one or more methods described herein.

FIG. 11 is a block diagram of an example computing device 1110 that may optionally be utilized to perform one or more aspects of techniques described herein. Computing device 1110 typically includes at least one processor 1114 which communicates with a number of peripheral devices via bus subsystem 1112. These peripheral devices may include a storage subsystem 1124, including, for example, a memory subsystem 1125 and a file storage subsystem 1126, user interface output devices 1120, user interface input devices 1122, and a network interface subsystem 1116. The input and output devices allow user interaction with computing device 1110. Network interface subsystem 1116 provides an interface to outside networks and is coupled to corresponding interface devices in other computing devices.

User interface input devices 1122 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1110 or onto a communication network.

User interface output devices 1120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1110 to the user or to another machine or computing device.

Storage subsystem 1124 stores programming and data constructs that provide the functionality of some or all of the modules described herein. For example, the storage subsystem 1124 may include the logic to perform selected aspects of the methods of FIG. 5 and FIG. 6, and/or to implement various components depicted in FIG. 2 and FIG. 3.

These software modules are generally executed by processor 1114 alone or in combination with other processors. Memory 1125 used in the storage subsystem 1124 can include a number of memories including a main random access memory (RAM) 1130 for storage of instructions and data during program execution and a read only memory (ROM) 1132 in which fixed instructions are stored. A file storage subsystem 1126 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1126 in the storage subsystem 1124, or in other machines accessible by the processor(s) 1114.

Bus subsystem 1112 provides a mechanism for letting the various components and subsystems of computing device 1110 communicate with each other as intended. Although bus subsystem 1112 is shown schematically as a single bus, alternative implementations of the bus subsystem may use multiple busses.

Computing device 1110 can be of varying types including a workstation, server, computing cluster, blade server, server farm, or any other data processing system or computing device. Due to the ever-changing nature of computers and networks, the description of computing device 1110 depicted in FIG. 11 is intended only as a specific example for purposes of illustrating some implementations. Many other configurations of computing device 1110 are possible having more or fewer components than the computing device depicted in FIG. 11.

Implementations disclosed herein include a method, comprising receiving, responsive to user interface inputs provided by a user at a client device, a request to prevent at least a particular search result, that is currently provided by a search engine responsive to a search query, from being provided by the search engine responsive to the search query, wherein the particular search result is for a corresponding web document, and wherein the request includes indications of the search query, the particular search result, and account information of the user. The method further includes the step of determining, based on the request, whether to prevent the particular search result from being provided by the search engine responsive to the search query. In response to determining to prevent the particular search result from being provided by the search engine responsive to the search query, the method further includes preventing the particular search result from being provided by the search engine responsive to future submissions of the search query and determining, based on the request, whether to prevent any search result, for the corresponding web document, from being provided by the search engine responsive to one or more additional queries. In response to determining to prevent any search result for the corresponding web document from being provided responsive to the one or more of the additional queries, the method further includes preventing any search result for the corresponding web document from being provided by the search engine responsive to one or more of the additional queries.

In some implementations, the method further includes identifying a second web document, determining, based on similarity between the corresponding web document and the second web document, whether to prevent any search result, for the second web document, from being provided by the search engine responsive to the one or more additional queries; and in response to determining to prevent any search result for the second web document from being provided responsive to the one or more additional queries, preventing any search result for the second web document from being provided by the search engine responsive to one or more of the additional queries.

In some implementations, determining whether to prevent any search result, for the corresponding web document, from being provided by the search engine responsive to the one or more additional queries includes processing, using a machine learning model, at least a portion of the request to generate output, wherein the machine learning model is trained using supervised training instances that each include corresponding request parameters for a corresponding request and a corresponding indication of whether the corresponding request was approved; and determining, based on the generated output, whether to prevent any search result, for the corresponding web document, from being provided by the search engine responsive to the one or more additional queries. In some of those implementations, the method further includes determining the one or more additional queries based on a magnitude of the generated output. In some of those implementations determining the one or more additional queries comprises determining the one or more additional queries based on the one or more additional queries having one or more terms in common with the search query and/or having semantic relatedness to the search query. In other implementations, processing at least the portion of the request using the machine learning model comprises processing account information that is based on the indication of the account information that is included in the request. In some of those implementations, the account information includes an age of an account of the user, a quantity of previous requests, for preventing search results from being provided, submitted by the account of the user, and/or one or more outcomes of one or more of the previous requests submitted by the account of the user. In other implementations, determining, based on the request, to prevent the particular search result from being provided by the search engine responsive to the search query is based on the generated output satisfying a first threshold; and determining, based on the request, to prevent any search result for the corresponding web document from being provided by the search engine responsive to one or more of the additional queries is based on the generated output satisfying a second threshold that is more restrictive than the first threshold.

In some implementations, determining, based on the request, whether to prevent the particular search result from being provided by the search engine responsive to the search query comprises: determining, based on processing the request, whether to (i) automatically approve the request or (ii) transmit the request to one or more reviewing client devices for manual review; and determining to prevent the particular search result from being provided by the search engine responsive to the search query in response to: determining to (i) automatically approve the request, or determining to (ii) transmit the request to one or more reviewing client devices for manual review, and receiving, responsive to transmitting the request, an indication that the request is to be approved. In some of those implementations, determining, based on the request, whether to prevent the particular search result from being provided by the search engine responsive to the search query further comprises: determining, based on processing the request, whether to (iii) automatically deny the request; determining to not prevent the particular search result from being provided by the search engine responsive to the search query in response to: determining to (iii) automatically deny the request, or determining to (ii) transmit the request to one or more reviewing client devices for manual review, and receiving, responsive to transmitting the request, an indication that the request is to be denied.

Implementations, described herein further includes a method that includes the steps of receiving, responsive to user interface inputs provided by a user at a client device, a request to prevent at least a particular search result, that is currently provided by a search engine responsive to a search query, from being provided by the search engine responsive to the search query, wherein the particular search result is for a corresponding web document, and wherein the request includes indications of the search query, the particular search result, and account information of the user, and determining, based on the request, whether to prevent the particular search result from being provided by the search engine responsive to the search query. In response to determining to prevent the particular search result from being provided by the search engine responsive to the search query, the method further includes preventing the particular search result from being provided by the search engine responsive to the search query; determining, based on the request, whether to prevent a related search result from being provided by the search engine responsive to the search query, wherein the related search result is for a related web document that includes at least a portion of the information that is included in the corresponding web document; and in response to determining to prevent the related search result from being provided, preventing the related search result from being provided by the search engine responsive to the search query.

In some implementations, determining whether to prevent the particular search result from being provided by the search engine responsive to the search query, comprises: processing the request, using a trained machine learning model, to generate output; and determining, based on the output satisfying a first threshold, to prevent the particular search result from being provided by the search engine responsive to the search query. In some of those implementations, determining whether to prevent the related search result from being provided by the search engine responsive to the search query comprises determining, based on the output satisfying a second threshold that is more restrictive than the first threshold, to prevent the related search result from being provided by the search engine responsive to the search query. In some of those implementations, preventing the related search result from being provided by the search engine responsive to the search query occurs without any prompting of the user that submitted the request. In some of those implementations, the related web document is indexed with the search query at a time of the request. In other of those implementations, the related web document is discovered, subsequent to the request, and wherein determining whether to prevent the related search result from being provided by the search engine responsive to the search query is performed responsive to discovery of the related web document.

In another aspect, a method is disclosed and includes the steps of receiving, responsive to user interface inputs provided by a user at a client device, a request to prevent at least a particular search result, that is currently provided by a search engine responsive to a search query, from being provided by the search engine responsive to the search query, wherein the particular search result is for a corresponding web document, and wherein the request includes indications of the search query, the particular search result, and account information of the user. The method further includes processing, using a machine learning model, at least a portion of the request to generate output, wherein the machine learning model is trained using supervised training instances that each include corresponding request parameters and a corresponding indication of whether the corresponding request was approved. In response to the output satisfying a first threshold, the method includes automatically preventing the particular search result from being provided by the search engine responsive to the query. In response to the output failing to satisfy a second threshold, the method includes automatically denying the request to prevent at least a particular search result. In response to the output failing to satisfy the first threshold and satisfying the second threshold, the method includes submitting the request to one or more reviewing client devices for further review.

In another aspect, a method is disclosed and includes the steps of receiving, responsive to user interface inputs provided by a user at a client device, a request to prevent at least a particular search result, that is currently provided by a search engine responsive to a search query, from being provided by the search engine responsive to the search query, wherein the particular search result is for a corresponding web document, and wherein the request includes indications of the search query, the particular search result, and account information of the user. The method further includes determining, based on processing the request, whether to (i) automatically approve the request, (ii) automatically deny the request, or (iii) transmit the request to one or more reviewing client devices for manual review. In response to determining to (i) automatically approve the request, the method includes preventing the particular search result from being provided by the search engine responsive to future submissions of the search query. In response to determining to (ii) automatically deny the request, the method includes bypassing preventing the particular search result from being provided by the search engine responsive to future submissions of the search query. In response to determining to (iii) transmit the request to one or more reviewing client devices for manual review, the method includes transmitting the request to the one or more reviewing client devices for manual review; and determining, based on one or more instances of feedback user interface inputs from the one or more reviewing client devices, whether to prevent the particular search result from being provided by the search engine responsive to future submission of the search query.

In some of those implementations, the method includes generating a request vector based on the indications of the search query, the particular search result, and the account information of the user and processing the request vector using a machine learning model to generate output, wherein determining, based on processing the request, whether to (i) automatically approve the request, (ii) automatically deny the request, or (iii) transmit the request to one or more reviewing client devices for manual review comprises determining, based on the output, whether to (i) automatically approve the request, (ii) automatically deny the request, or (iii) transmit the request to one or more reviewing client devices for manual review. In some of those implementations, determining, based on the output, whether to (i) automatically approve the request, (ii) automatically deny the request, or (iii) transmit the request to one or more reviewing client devices for manual review, includes: determining to (i) automatically approve the request when the output satisfies a first threshold; determining to (ii) automatically deny the request when the output fails to satisfy the first threshold and also fails to satisfy a second threshold; and determining to (iii) transmit the request to one or more reviewing client devices for manual review when the output satisfies the second threshold but fails to satisfy the first threshold. In some of those implementations, in response to the request, it is determined to (iii) transmit the request to the one or more reviewing client devices for manual review, and further includes generating a training instance based on the request and based on the determination, that is based on the one or more instances of feedback user interface inputs from the one or more reviewing client devices, of whether to prevent the particular search result from being provided by the search engine responsive to future submission of the search query; and training the machine learning model using the training instance. In other of those implementations, processing the request further includes processing the request to determine whether it satisfies one or more predefined denial rules; and determining to (ii) automatically deny the request if any of the one or more predefined denial rules are satisfied. In some of those instances, processing the request vector using the machine learning model to generate output occurs after processing the request to determine whether it satisfies the one or more predefined denial rules, and is contingent on determining that the one or more predefined denial rules are not satisfied. In other instances, the account information of the user includes an age of the account. In still other instances, the account information of the user includes a history of previous requests from the user to prevent one or more additional search results from being provided. In some of those instances, the account information of the user includes a measure of success of the previous requests of the user.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

The invention claimed is:

1. A method implemented by one or more processors, the method comprising:
   receiving, responsive to user interface inputs provided by a user at a client device, a request to prevent at least a particular search result, that is currently provided by a search engine responsive to a search query, from being provided by the search engine responsive to the search query, wherein the particular search result is for a corresponding web document, and wherein the request includes indications of:
      the search query,
      the particular search result, and
      account information of the user;
   determining, based on the request, whether to prevent the particular search result from being provided by the search engine responsive to the search query;
   in response to determining to prevent the particular search result from being provided by the search engine responsive to the search query:
      preventing the particular search result from being provided by the search engine responsive to future submissions of the search query;
   determining, based on the request, whether to prevent any search result, for the corresponding web document, from being provided by the search engine responsive to one or more additional queries; and
   in response to determining to prevent any search result for the corresponding web document from being provided responsive to the one or more of the additional queries:
      preventing any search result for the corresponding web document from being provided by the search engine responsive to one or more of the additional queries.

2. The method of claim 1, further comprising:
   identifying a second web document;
   determining, based on similarity between the corresponding web document and the second web document, whether to prevent any search result, for the second web document, from being provided by the search engine responsive to the one or more additional queries; and
   in response to determining to prevent any search result for the second web document from being provided responsive to the one or more additional queries:
      preventing any search result for the second web document from being provided by the search engine responsive to one or more of the additional queries.

3. The method of claim 1, wherein determining whether to prevent any search result, for the corresponding web document, from being provided by the search engine responsive to the one or more additional queries includes:
   processing, using a machine learning model, at least a portion of the request to generate output, wherein the machine learning model is trained using supervised training instances that each include corresponding request parameters for a corresponding request and a corresponding indication of whether the corresponding request was approved; and
   determining, based on the generated output, whether to prevent any search result, for the corresponding web document, from being provided by the search engine responsive to the one or more additional queries.

4. The method of claim 3, further comprising determining the one or more additional queries based on a magnitude of the generated output.

5. The method of claim 4, wherein determining the one or more additional queries comprises determining the one or more additional queries based on the one or more additional queries having one or more terms in common with the search query and/or having semantic relatedness to the search query.

6. The method of claim 3, wherein processing at least the portion of the request using the machine learning model comprises processing account information that is based on the indication of the account information that is included in the request.

7. The method of claim 6, wherein the account information comprises:
   an age of an account of the user;
   a quantity of previous requests, for preventing search results from being provided, submitted by the account of the user; and/or
   one or more outcomes of one or more of the previous requests submitted by the account of the user.

8. The method of claim 3, wherein determining, based on the request, to prevent the particular search result from being provided by the search engine responsive to the search query is based on the generated output satisfying a first threshold; and
   wherein determining, based on the request, to prevent any search result for the corresponding web document from being provided by the search engine responsive to one or more of the additional queries is based on the generated output satisfying a second threshold that is more restrictive than the first threshold.

9. The method of claim 1, wherein determining, based on the request, whether to prevent the particular search result from being provided by the search engine responsive to the search query comprises:
   determining, based on processing the request, whether to (i) automatically approve the request or (ii) transmit the request to one or more reviewing client devices for manual review; and
   determining to prevent the particular search result from being provided by the search engine responsive to the search query in response to:
      determining to (i) automatically approve the request, or
      determining to (ii) transmit the request to one or more reviewing client devices for manual review, and receiving, responsive to transmitting the request, an indication that the request is to be approved.

10. The method of claim 9, wherein determining, based on the request, whether to prevent the particular search result from being provided by the search engine responsive to the search query further comprises:
   determining, based on processing the request, whether to (iii) automatically deny the request;
   determining to not prevent the particular search result from being provided by the search engine responsive to the search query in response to:
      determining to (iii) automatically deny the request, or
      determining to (ii) transmit the request to one or more reviewing client devices for manual review, and receiving, responsive to transmitting the request, an indication that the request is to be denied.

11. A system comprising:
   memory storing instructions;
   one or more processors operable to execute the instructions to:
      receive, responsive to user interface inputs provided by a user at a client device, a request to prevent at least a particular search result, that is currently provided by a search engine responsive to a search query, from being provided by the search engine responsive to the search query, wherein the particular search result is for a corresponding web document, and wherein the request includes indications of:
         the search query,
         the particular search result, and
         account information of the user;
      determine, based on the request, whether to prevent the particular search result from being provided by the search engine responsive to the search query;
      in response to determining to prevent the particular search result from being provided by the search engine responsive to the search query:
         prevent the particular search result from being provided by the search engine responsive to future submissions of the search query;
      determine, based on the request, whether to prevent any search result, for the corresponding web document, from being provided by the search engine responsive to one or more additional queries; and
      in response to determining to prevent any search result for the corresponding web document from being provided responsive to the one or more of the additional queries:
         prevent any search result for the corresponding web document from being provided by the search engine responsive to one or more of the additional queries.

12. The system of claim 11, wherein one or more of the processors are further operable to execute the instructions to:
   identify a second web document;
   determine, based on similarity between the corresponding web document and the second web document, whether to prevent any search result, for the second web document, from being provided by the search engine responsive to the one or more additional queries; and
   in response to determining to prevent any search result for the second web document from being provided responsive to the one or more additional queries:
      prevent any search result for the second web document from being provided by the search engine responsive to one or more of the additional queries.

13. The system of claim 11, wherein in determining whether to prevent any search result, for the corresponding web document, from being provided by the search engine responsive to the one or more additional queries one or more of the processors are to:
   process, using a machine learning model, at least a portion of the request to generate output, wherein the machine learning model is trained using supervised training instances that each include corresponding request parameters for a corresponding request and a corresponding indication of whether the corresponding request was approved; and
   determine, based on the generated output, whether to prevent any search result, for the corresponding web document, from being provided by the search engine responsive to the one or more additional queries.

14. The system of claim 13, wherein one or more of the processors are further operable to execute the instructions to determine the one or more additional queries based on a magnitude of the generated output.

15. The system of claim 14, wherein in determining the one or more additional queries one or more of the processors are to determine the one or more additional queries based on the one or more additional queries having one or more terms in common with the search query and/or having semantic relatedness to the search query.

16. The system of claim 13, wherein in processing at least the portion of the request using the machine learning model one or more of the processors are to process account information that is based on the indication of the account information that is included in the request.

17. The system of claim 16, wherein the account information comprises:
   an age of an account of the user;
   a quantity of previous requests, for preventing search results from being provided, submitted by the account of the user; and/or
   one or more outcomes of one or more of the previous requests submitted by the account of the user.

18. The system of claim 13, wherein determining, based on the request, to prevent the particular search result from being provided by the search engine responsive to the search query is based on the generated output satisfying a first threshold; and wherein determining, based on the request, to prevent any search result for the corresponding web document from being provided by the search engine responsive to one or more of the additional queries is based on the generated output satisfying a second threshold that is more restrictive than the first threshold.

19. The system of claim 11, wherein in determining, based on the request, whether to prevent the particular search result from being provided by the search engine responsive to the search query one or more of the processors are to:

determine, based on processing the request, whether to (i) automatically approve the request or (ii) transmit the request to one or more reviewing client devices for manual review; and determine to prevent the particular search result from being provided by the search engine responsive to the search query in response to:

determining to (i) automatically approve the request, or determining to (ii) transmit the request to one or more reviewing client devices for manual review, and receiving, responsive to transmitting the request, an indication that the request is to be approved.

20. The system of claim 19, wherein in determining, based on the request, whether to prevent the particular search result from being provided by the search engine responsive to the search query one or more of the processors are further to:

determine, based on processing the request, whether to (iii) automatically deny the request;

determine to not prevent the particular search result from being provided by the search engine responsive to the search query in response to:

determining to (iii) automatically deny the request, or determining to (ii) transmit the request to one or more reviewing client devices for manual review, and receiving, responsive to transmitting the request, an indication that the request is to be denied.

\* \* \* \* \*